(12) United States Patent
Ichimasa

(10) Patent No.: US 8,045,037 B2
(45) Date of Patent: Oct. 25, 2011

(54) IMAGE SENSING APPARATUS AND CONTROL METHOD FOR RELAXING RED-EYE EFFECT IN SENSED IMAGE DATA

(75) Inventor: Shoji Ichimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 12/045,072

(22) Filed: Mar. 10, 2008

(65) Prior Publication Data

US 2008/0211936 A1 Sep. 4, 2008

Related U.S. Application Data

(62) Division of application No. 10/899,994, filed on Jul. 13, 2004, now Pat. No. 7,414,667.

(30) Foreign Application Priority Data

Jul. 15, 2003 (JP) .................................. 2003-274738
Dec. 26, 2003 (JP) .................................. 2003-435452

(51) Int. Cl.
*H04N 5/222* (2006.01)

(52) U.S. Cl. .................................. 348/333.04; 348/371

(58) Field of Classification Search .................. 348/241, 348/333.01, 333.02, 333.04, 333.11, 333.12, 348/370, 371; 382/162, 167, 274, 275
See application file for complete search history.

(56) References Cited

U.S. PATENT DOCUMENTS

| | | | |
|---|---|---|---|
| 5,206,678 A | 4/1993 | Kasumi | |
| 5,264,894 A | 11/1993 | Kobayashi et al. | |
| 5,950,023 A | 9/1999 | Hara et al. | |
| 6,047,138 A | 4/2000 | Teremy | |
| 6,134,339 A | 10/2000 | Luo | |
| 7,024,035 B1 * | 4/2006 | Enomoto | 382/167 |
| 7,042,501 B1 * | 5/2006 | Matama | 348/222.1 |
| 7,298,409 B1 * | 11/2007 | Misawa | 348/333.01 |
| 2002/0136450 A1 | 9/2002 | Chen et al. | |
| 2004/0041924 A1 * | 3/2004 | White et al. | 348/239 |
| 2004/0160517 A1 * | 8/2004 | Iida | 348/207.99 |
| 2005/0163498 A1 * | 7/2005 | Battles et al. | 396/158 |

FOREIGN PATENT DOCUMENTS

| | | |
|---|---|---|
| EP | 0 884 694 | 12/1998 |
| EP | 0 911 759 | 4/1999 |
| EP | 0 989 517 | 11/2006 |
| JP | 58-48088 | 3/1983 |
| JP | 3-114103 | 5/1991 |
| JP | 3114103 B | 7/1992 |
| JP | 08-286240 A | 11/1996 |

OTHER PUBLICATIONS

Communication from EPO dated Oct. 29, 2007 with European Search Report for Application No. 04254149.0-2202.

* cited by examiner

*Primary Examiner* — Timothy J Henn
(74) *Attorney, Agent, or Firm* — Canon U.S.A., Inc. I.P. Division

(57) ABSTRACT

This invention makes it possible to execute photography with a sufficient red-eye relaxation effect. To do this, in this invention, the amount of a red eye is detected on the basis of a signal obtained by reading an object image under light projection by a light projection unit. The light projection by the light projection unit is controlled on the basis of the detection result.

10 Claims, 25 Drawing Sheets r : RED-EYE DIAMETER AFTER CONTRACTION

IMAGE SENSING APPARATUS AND CONTROL METHOD FOR RELAXING RED-EYE EFFECT IN SENSED IMAGE DATA

CROSS-REFERENCE TO RELATED APPLICATIONS

This application is a divisional of prior application Ser. No. 10/889,994, filed Jul. 13, 2004, to which priority under 35 U.S.C. §120 is claimed. This application also claims priorities from Japanese Patent Application Nos. 2003-274738 filed on Jul. 15, 2003 and 2003-435452 filed on Dec. 26, 2003 the entire contents of which are incorporated herein by reference.

FIELD OF THE INVENTION

The present invention relates to control and a program for relaxing a red-eye effect that occurs when an image sensing apparatus is used.

BACKGROUND OF THE INVENTION

To relax a red-eye effect in photography using an electronic flash (flash), a technique is conventionally used, in which human pupils are pre-illuminated with flash light before photography, thereby contracting the pupils (e.g., Japanese Patent Publication No. 58-48088). This technique should suppress the amount of flash light reflected by retinas by contracting the pupils before photography.

In another technique used in a digital still camera, image data by flash photography and that by non-flash photography are compared. With this processing, the portions and sizes of red eyes generated by reflection of flash light on the retinal positions of eyes are detected from the image data by flash photography, and the image data is corrected (e.g., Japanese Patent No. 3114103).

In Japanese Patent Publication No. 58-48088 using the conventional red-eye relaxation means, photography is permitted after the predetermined light emission by the red-eye relaxation means assuming that the red-eye relaxation effect is obtained. However, whether the red-eye relaxation effect is obtained can be known only after photography.

In Japanese Patent No. 3114103, image data by flash photography and that by non-flash photography are compared to detect the positions and sizes of red eyes generated by reflection of flash light on the retinal portions of eyes from the image data by flash photography. However, the photographic conditions of the two image data do not coincide (one image data is obtained by non-flash photography, and the other is obtained by flash photography). In addition, at the time of flash photography, since the illuminance is too low, the pupils are dilated. At this time, an image 111 shown in FIG. 8 is obtained. At the time of non-flash photography, since the illuminance is sufficient, the pupils are contracted. At this time, an image 113 shown in FIG. 8 is obtained. The target of red-eye correction is the image 111 at the time of flash photography, i.e., the image with the dilated pupil. For this reason, the correction result tends to be unnatural because the region to be corrected is large.

Furthermore, in the image obtained by non-flash photography, the positions or sizes of red eyes cannot accurately be detected because the brightness is too low.

SUMMARY OF THE INVENTION

In order to solve the above problems, according to the present invention, there are provided an image sensing apparatus, an image processing apparatus, and a control method therefor, in which light is projected to an object, a signal is output in accordance with input of the light, the amount of a red eye is detected on the basis of a signal obtained by reading the object image under the light projection, and a main image sensing instruction is permitted in accordance with the detection result.

According to the present invention, there are also provided an image sensing apparatus, an image processing apparatus, and a control method therefor, in which light is projected to an object, a signal is output in accordance with input of the light, the amount of a red eye is detected on the basis of a signal obtained by reading the object image under the light projection, and the light projection by the light projection means is controlled in accordance with the detection result.

According to the present invention, there are also provided an image sensing apparatus, an image processing apparatus, and a control method therefor, in which light is projected to an object, a signal is output in accordance with input of the light, the signal is stored, an image is displayed on the basis of the stored signal, a red-eye position is detected on the basis of a signal obtained by reading the object image under the light projection, and control is performed to cause the display means to enlarge and display an image in a predetermined region corresponding to the detected red-eye position.

According to an aspect of the present invention, there is provided a technique for accurately detecting the presence/absence of a red eye and the position and size of the red eye. According to another aspect of the present invention, there is provided a technique for executing image sensing while reflecting the detection result to relax a red eye and execute natural red-eye correction.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The embodiments will be described.
<Arrangement>

Figure 1:
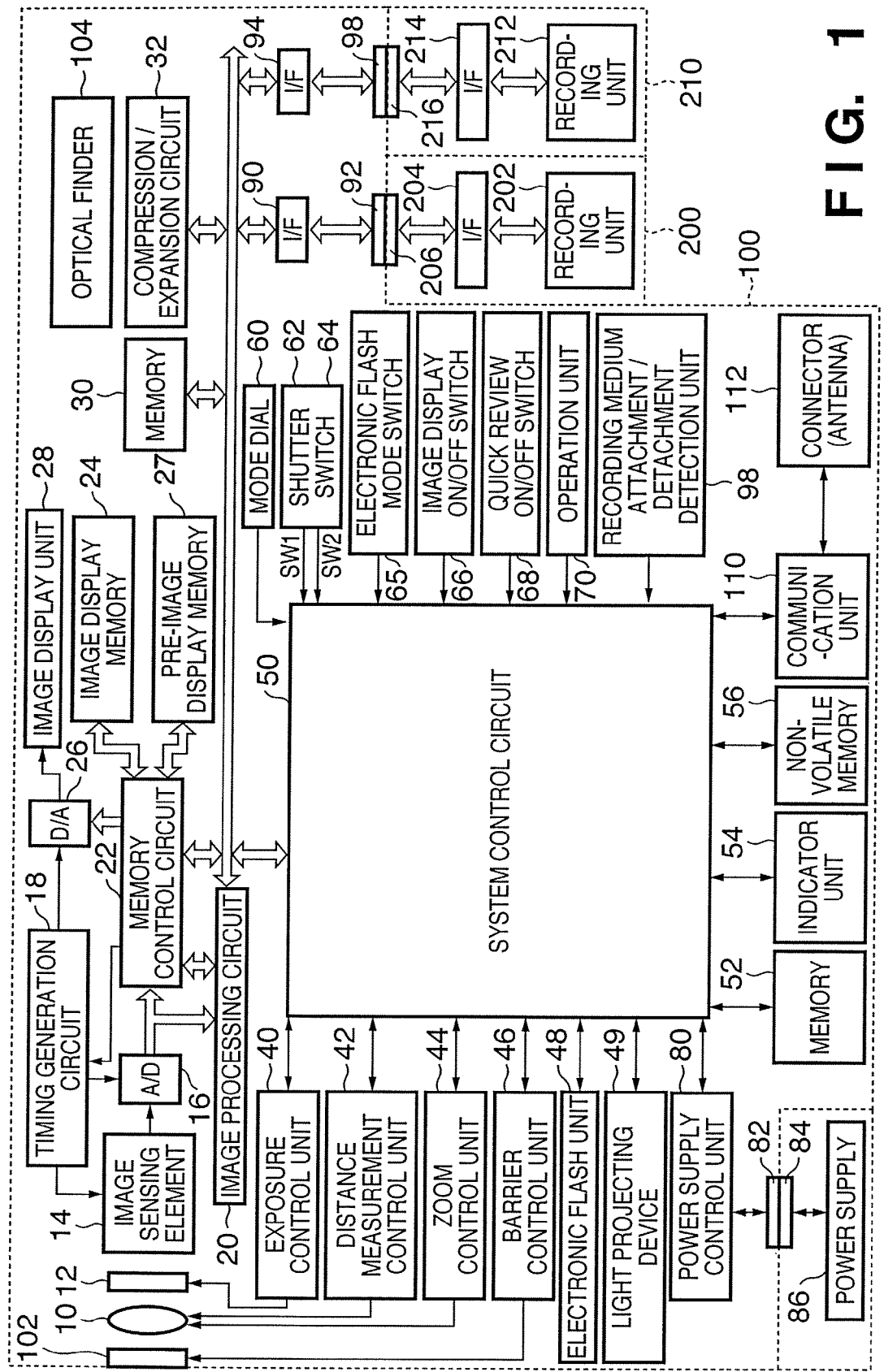
FIG. 1 is a block diagram of an apparatus according to the first embodiment.

The first embodiment of the present invention will be described below with reference to the accompanying drawings. FIG. 1 is a block diagram showing the arrangement of the first embodiment of the present invention.

FIG. 1 is a block diagram for explaining the arrangement of a camera 100 to which the present invention is applied.

Reference numeral 10 denotes a photographic lens. A shutter 12 has a stop function. An image sensing element 14 serves as an image sensing means for outputting a signal in correspondence with incident light. An A/D converter 16 converts the analog signal output from the image sensing element 14 into a digital signal.

A timing generation circuit 18 supplies a clock signal or control signal to the image sensing element 14, A/D converter 16, and D/A converter 26. The timing generation circuit 18 is controlled by a memory control circuit 22 and a system control circuit 50.

An image processing circuit 20 executes predetermined pixel interpolation processing or color conversion processing for the signal from the A/D converter 16 or the signal from the memory control circuit 22. The image processing circuit 20 also executes predetermined arithmetic processing by using a sensed image signal. On the basis of the obtained arithmetic result, the system control circuit 50 executes AF (Auto Focus) processing, AE (Auto Exposure) processing, and EF (Electronic Flash pre-emission) processing of TTL (Through The Lens) scheme to control an exposure control unit 40 and a distance measurement control unit 42.

The image processing circuit 20 also executes predetermined arithmetic processing by using the sensed image signal and executes AWB (Auto White Balance) processing of TTL scheme on the basis of the obtained arithmetic result.

The memory control circuit 22 controls the A/D converter 16, timing generation circuit 18, image processing circuit 20, image display memory 24, D/A converter 26, memory 30, and compression/expansion circuit 32.

The signal from the A/D converter 16 is written in the image display memory 24 or memory 30 through the image processing circuit 20 and memory control circuit 22, or directly through the memory control circuit 22.

Reference numeral 24 denotes an image display memory; 26, a D/A converter; 27, a pre-image display memory which stores an image signal stored in the image display memory 24; and 28, an image display unit on which a display image signal written in the image display memory 24 is displayed through the D/A converter 26.

When a sensed image signal is sequentially displayed by using the image display unit 28, an electronic finder function can be implemented.

The image display unit 28 can arbitrarily turn on/off display in accordance with an instruction from the system control circuit 50. When display is turned off, power consumption of the image processing apparatus 100 can largely be reduced.

The memory 30 stores a photographed still image or moving image. The memory 30 has a storage capacity large enough to store a predetermined number of still images or a moving image for a predetermined time. Accordingly, even in panoramic photography or continuous shooting for continuously taking a plurality of still images, a large quantity of images can quickly be written in the memory 30.

The memory 30 can also be used as a work area of the system control circuit 50.

The compression/expansion circuit 32 compresses/expands an image signal by ADCT (Adaptive Discrete Cosine Transform). The compression/expansion circuit 32 loads an image stored in the memory 30, compresses or expands it, and writes the processed image in the memory 30.

The exposure control unit 40 controls the shutter 12 having a stop function. The exposure control unit 40 also has a flash brightness control function in cooperation with an electronic flash 48.

The distance measurement control unit 42 controls focusing of the photographic lens 10. A zoom control unit 44 controls zooming of the photographic lens 10. A barrier control unit 46 controls the operation of a protection unit 102 serving as a barrier.

The electronic flash 48 also has an AF auxiliary light projecting function and a flash light control function.

The exposure control unit 40 and distance measurement control unit 42 are controlled by the TTL scheme. On the basis of an arighetmic result obtained by the image processing circuit 20 by processing a sensed image signal, the system control circuit 50 controls the exposure control unit 40 and distance measurement control unit 42.

A light projecting device 49 includes an LED or a lamp and projects light when the object luminance is less than a predetermined brightness. The light projecting device is located at the same position as the electronic flash 48 or closer with respect to the photographic lens 10. The light projecting device is configured to contract pupils by light projection to relax the red-eye effect and also generate the red-eye effect on the image.

The system control circuit 50 controls the entire image processing apparatus 100. A memory 52 stores constants, variables, and programs for the operations of the system control circuit 50.

An indicator unit 54 such as a liquid crystal display device or a speaker indicates the operation state or a message by using characters, images, or sound in accordance with execution of a program by the system control circuit 50. One or a plurality of indicator units 54 are arranged at visible positions near the operation unit of the image processing apparatus 100. The indicator unit 54 includes a combination of, e.g., an LCD, LED, and sound generation element.

Some of the functions of the indicator unit 54 are arranged in an optical finder 104.

Of the indication contents of the indicator unit 54, examples of indication on the LED or the like are the single shot/continuous shooting mode, self timer, compression ratio, number of recording pixels, number of recorded images, number of recordable images, shutter speed, F-number, exposure compensation, flash, red-eye effect relaxation, macro photography, buzzer setting, timer battery level, battery level, error, information by a plurality of digits, attached state of a recording medium 200 or 210, operation of communication I/F, and date/time.

Of the indication contents of the indicator unit 54, examples of indication in the optical finder 104 are in-focus, camera shake warning, electronic flash charge, shutter speed, F-number, and exposure compensation.

An electrically erasable/recordable nonvolatile memory 56 is, e.g. an EEPROM.

Reference numerals 60, 62, 64, 65, 66, 68, and 70 denote operation means for inputting various kinds of operation instructions of the system control circuit 50. They include single devices such as a switch, dial, touch panel, or pointing by detection of a line of sight, and voice recognition device, or a combination of a plurality of devices.

<Operation>

These operation means will be described here in detail.

The mode dial switch 60 can selectively set function modes such as power off, auto photography mode, photography mode, panoramic photography mode, playback mode, multi-window playback/erase mode, and PC connection mode.

The shutter switch SW1 62 is turned on midway during the operation of a shutter button (not shown) and instructs the start of an operation such as AF (Auto Focus) processing, AE (Auto Exposure) processing, AWB (Auto White Balance) processing, or EF (Electronic Flash pre-emission) processing.

The shutter switch SW2 64 is turned on at the end of operation of a shutter button (not shown) and instructs the start of a series of processing operations including exposure processing for writing an image signal read from the image sensing element 14 in the memory 30 through the A/D converter 16 and memory control circuit 22, development processing using arithmetic processing by the image processing circuit 20 or memory control circuit 22, and recording processing for reading out the image signal from the memory 30, causing the compression/expansion circuit 32 to compress the image signal, and writing it in the recording medium 200 or 210.

The electronic flash mode SW 65 sets an electronic flash mode such as a forcible light emission mode, auto emission mode, red-eye relaxing auto emission mode, or light emission off.

The image display ON/OFF switch 66 can set ON/OFF of the image display unit 28.

With this function, current supply to the image display unit can be stopped in photography using the optical finder 104 so that the power consumption can be reduced.

The quick review ON/OFF switch 68 sets a quick review function of automatically playing back a sensed image signal immediately after photography. In this embodiment, especially, the quick review function is set when the image display unit 28 is OFF.

The operation unit 70 includes various kinds of buttons and a touch panel. The operation unit 70 has a menu button, set button, macro button, multiwindow playback page break button, single shot/continuous shot/self timer switching button, menu move + (plus) button, menu move − (minus) button, playback image move + (plus) button, playback image move − (minus) button, photographed image quality selection button, exposure compensation button, enlargement button that sets display enlargement in red-eye relaxation, and date/time setting button.

A power supply control unit 80 includes a battery detection circuit, DC/DC converter, and switch circuit which selects a block to be energized. The power supply control unit 80 detects the presence/absence of a battery, battery type, and battery level, controls the DC/DC converter on the basis of the detection result and an instruction from the system control circuit 50, and supplies a necessary voltage to the units including a recording medium for a necessary period.

Reference numeral 82 denotes a connector; 84, a connector; and 86, a power supply unit such as a primary cell such as an alkaline cell or lithium cell, a secondary cell such as an NiCd cell, NiMH cell, or Li cell, or an AC adapter.

Reference numerals 90 and 94 denote interfaces to the recording media such as a memory card and hard disk; 92 and 96, connectors connected to the recording media such as a memory card and hard disk; and 98, a recording medium attachment detection unit which detects whether the recording medium 200 or 210 is attached to the connector 92 or 96.

This embodiment will be described assuming that the apparatus has two systems of interfaces and connectors to which recording media are attached. The apparatus may have one or a plurality of systems of interfaces and connectors to which recording media are attached, as a matter of course. In addition, interfaces or connectors of different standards may be combined.

Interfaces and connectors based on a standard such as a PCMCIA card or CF (compact flash (R)) card may be used.

When the interfaces 90 and 94 and connectors 92 and 96 based on a standard such as a PCMCIA card or CF (compact flash (R)) card are used, and various kinds of communication cards such as a LAN card, modem card, USB card, IEEE1394 card, P1284 card, SCSI card, or communication card for PHS is connected, an image signal or management information associated with the image signal can be transferred to/from another computer or a peripheral device such as a printer.

The protection unit 102 serves as a barrier which covers the image sensing unit including the lens 10 of the image processing apparatus 100 to prevent any dirt or damage to the image sensing unit.

Photography can be executed by using only the optical finder 104 without using the electronic finder function by the image display unit 28. The optical finder 104 incorporates some functions of the indicator unit 54, including, e.g., in-focus indication, camera shake warning indication, electronic flash charge indication, shutter speed indication, F-number indication, and exposure compensation indication.

A communication unit 110 has various kinds of communication functions such as RS232C, USB, IEEE1394, P1284, SCSI, modem, LAN, and wireless communication.

A connector 112 connects the image processing apparatus 100 to another device via the communication unit 110. For wireless communication, the connector 112 serves as an antenna.

The recording medium 200 includes a memory card or hard disk.

The recording medium 200 comprises a recording unit 202 including a semiconductor memory or magnetic disk, an interface 204 to the image processing apparatus 100, and a connector 206 connected to the image processing apparatus 100.

The recording medium 210 includes a memory card or hard disk.

The recording medium 210 comprises a recording unit 212 including a semiconductor memory or magnetic disk, an interface 214 to the image processing apparatus 100, and a connector 216 connected to the image processing apparatus 100.

Figure 7A:
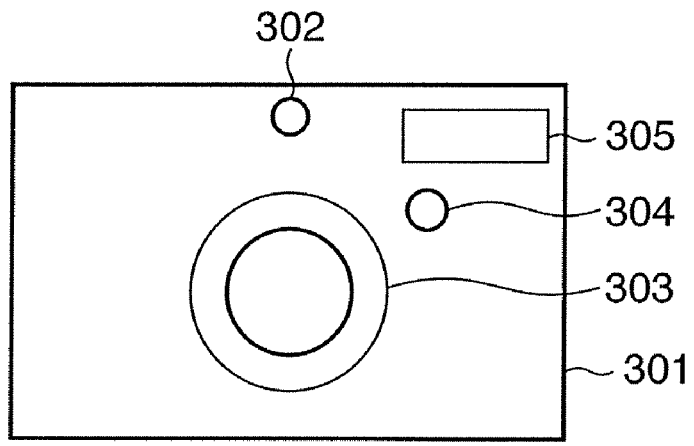
FIGS. 7A to 7C are views of an image sensing apparatus.
Figure 7B:
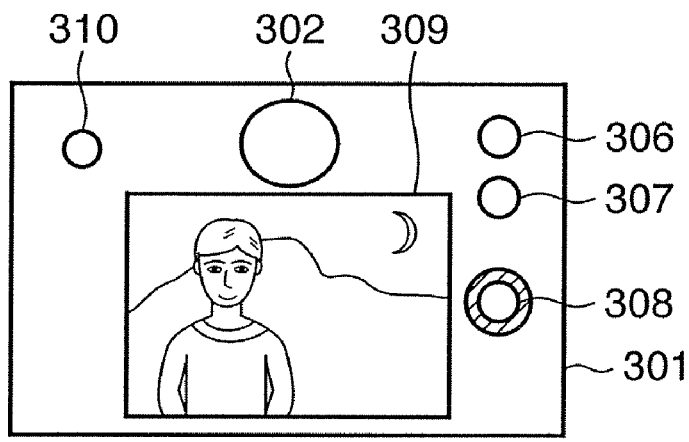
Figure 7C:
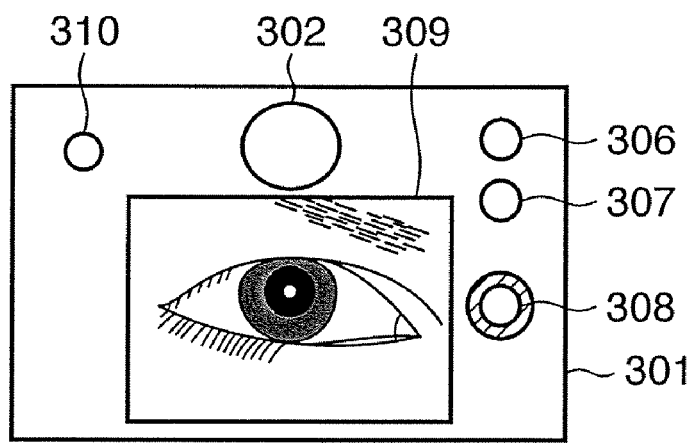

FIGS. 7A to 7C show the outer appearance of the camera. FIG. 7A is a view showing the camera from the front side. Reference numeral 301 denotes a camera main body; 302, an optical finder; 303, a lens barrel which includes the photographic lens and executes zooming and focusing of the lens; 304, a red-eye light projector which projects light from a lamp or LED to detect the red-eye position and relax the red-eye effect; and 305, an electronic flash light-emitting unit.

FIGS. 7B and 7C are views showing the camera from the rear side. An image display button 306 turns on/off the above-described image display ON/OFF switch 66. A quick view button 307 turns on/off the above-described quick view ON/OFF switch 68. A mode dial 308 sets the above-described mode dial switch 60. An external LCD 309 serves as the above-described image display unit 28. An electronic flash mode button 310 turns on/off the electronic flash mode SW 65.

To help understanding of the embodiment, it will be described below with reference to FIGS. 2 to 6, 10, and 11A and 11B.

<Operation Processing Flow>

Figure 2:
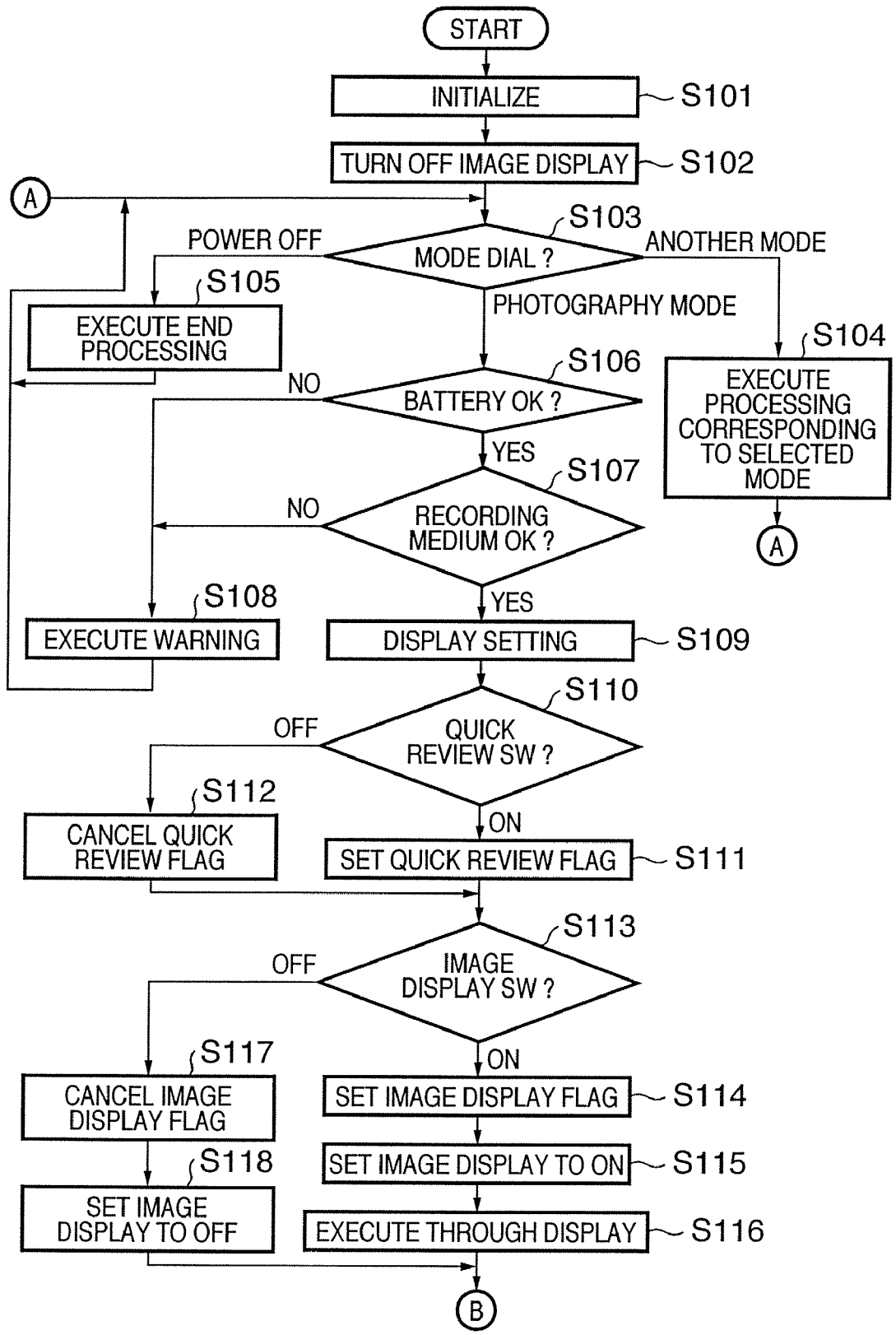
FIG. 2 is a flowchart showing part of a main routine according to the first embodiment.
Figure 3A:
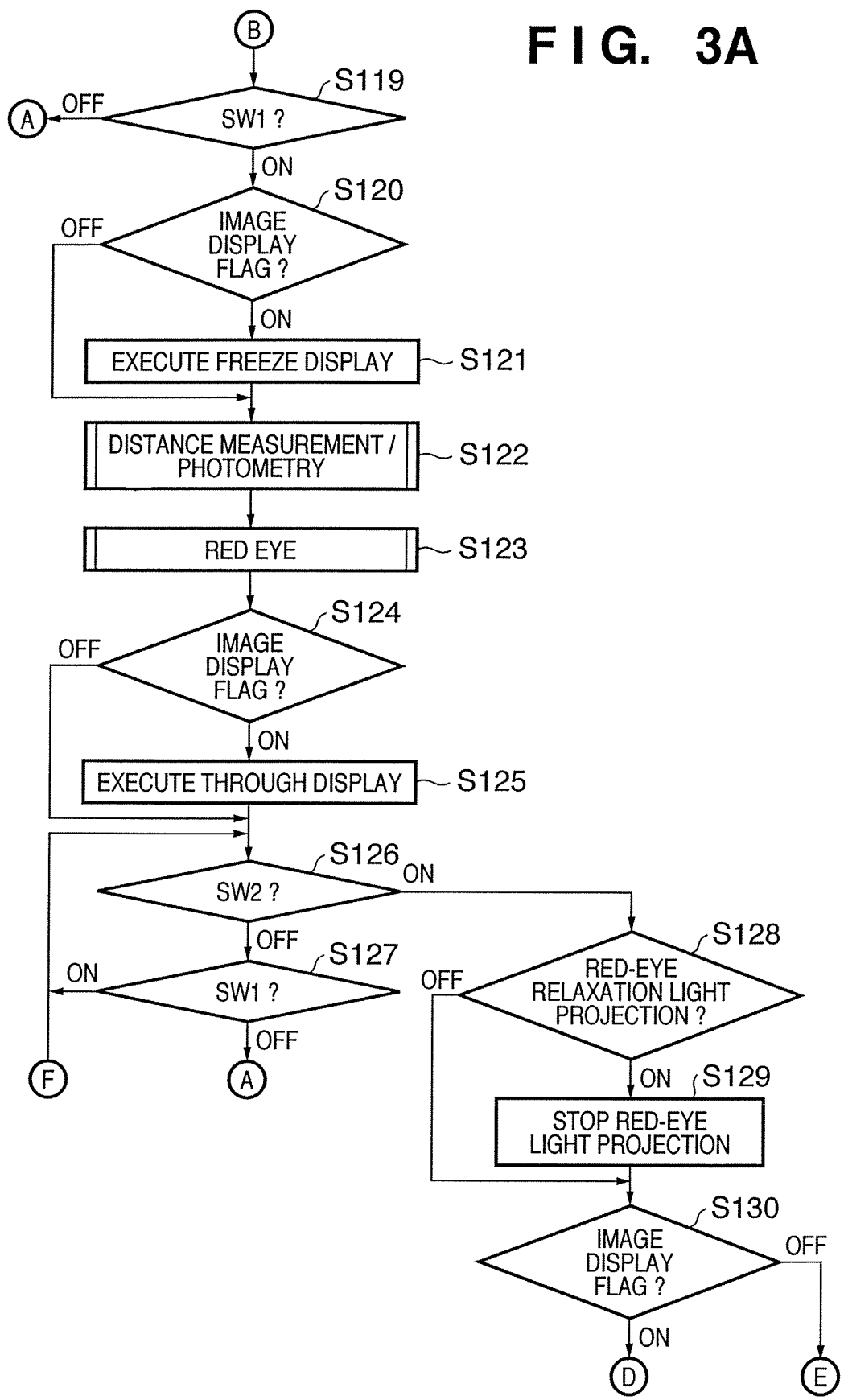
FIGS. 3A and 3B are flowcharts showing part of the main routine according to the first embodiment.
Figure 3B:
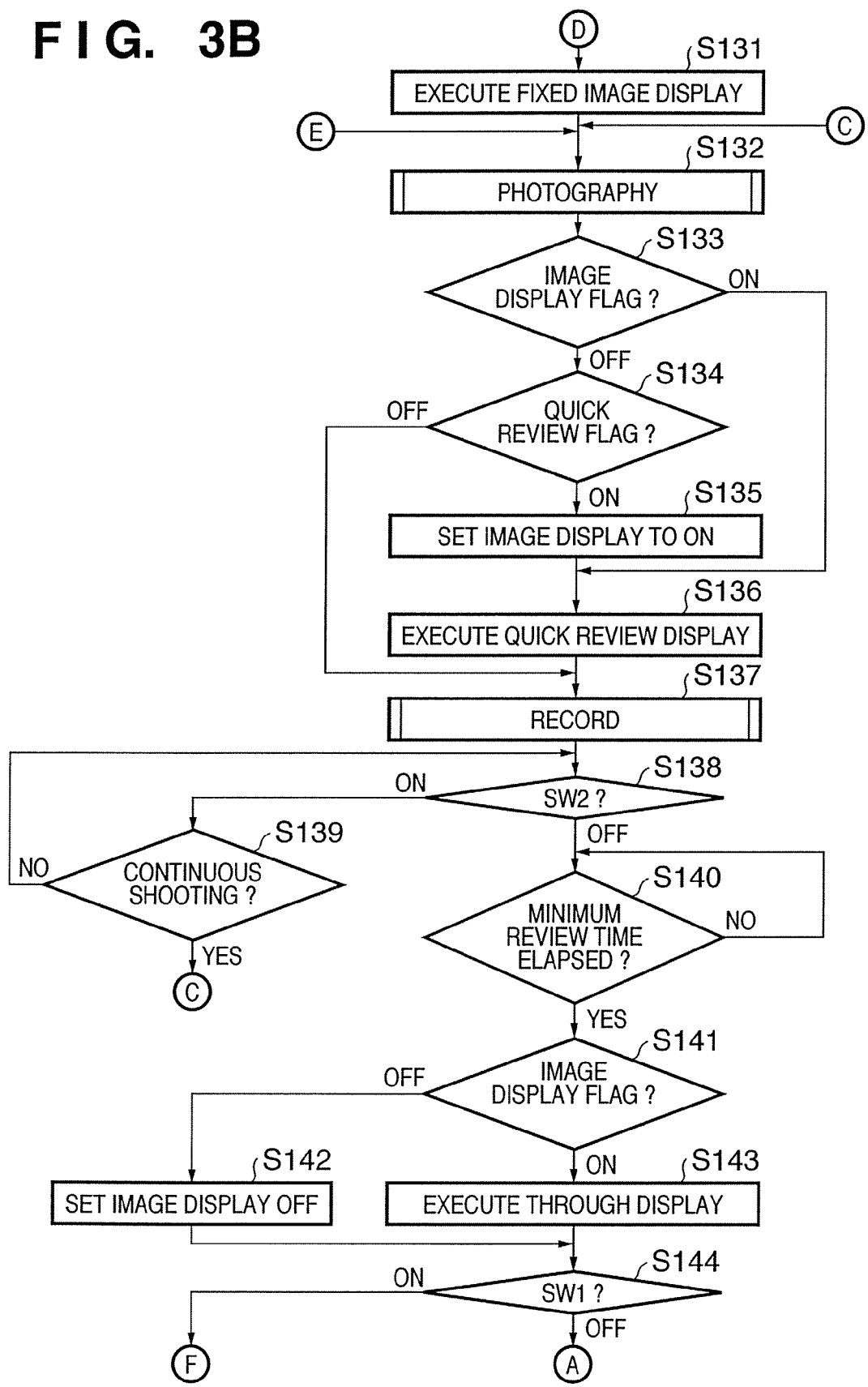

FIGS. 2, 3A and 3B are flowcharts of the main routine of the apparatus 100 according to this embodiment. The operation of the apparatus 100 will be described below with reference to FIGS. 2, 3A and 3B.

When the apparatus is powered on by, e.g., loading a new battery, the system control circuit 50 initializes flags and control variables (step S101) and initializes image display of the image display unit 28 to the OFF state (step S102).

The system control circuit 50 determines the set position of the mode dial 60. When the mode dial 60 is set to power OFF (step S103), the display states of display units are changed to the end state. The barrier of the protection unit 102 is closed to protect the image sensing unit. Necessary parameters, set values, and set modes, including flags and control variables, are recorded in the nonvolatile memory 56. The power supply control unit 80 cuts off unnecessary power of the units of the apparatus 100, including the image display unit 28. After the predetermined end processing is executed (step S105), the flow returns to step S103.

If it is determined in step S103 that the mode dial 60 is set to power ON, and the photography mode is set, the flow advances to step S106. If it is determined that the mode dial 60 is set to any other mode (e.g., browsing of sensed and stored images or selection and erase of images), the system control circuit 50 executes processing corresponding to the selected mode (step S104). After the end of the processing, the flow returns to step S103.

In step S106, the system control circuit 50 causes the power supply control unit 80 to determine whether the level or operation situation of the power supply 86 including a battery or the like has a problem. If NO in step S106, the indicator unit 54 executes predetermined warning indication by an image or sound (step S108), and the flow returns to step S103.

If YES in step S106, the system control circuit 50 determines whether the operation state of the recording medium 200 or 210 has a problem for the operation of the apparatus 100 and, more particularly, the image data recording/playback operation for the recording medium (step S107). If NO in step S107, the indicator unit 54 executes predetermined warning indication by an image or sound (step S108), and the flow returns to step S103.

If YES in step S107, the flow advances to step S109 to cause the indicator unit 54 to indicate various set states of the apparatus 100 by an image or sound. If image display of the image display unit 28 is ON, various set states of the apparatus 100 are indicated by an image or sound by using even the image display unit 28.

In step S110, the system control circuit 50 checks the set state of the quick review ON/OFF switch 68. If quick review ON is set, a quick review flag is set (step S111). If quick review OFF is set, the quick review flag is canceled (step S112). The state of the quick review flag is stored in the internal memory of the system control circuit 50 or the memory 52.

The system control circuit 50 determines the set state of the image display ON/OFF switch 66 (step S113). If image display ON is set, an image display flag is set (step S114). In addition, image display of the image display unit 28 is set to the ON state (step S115). Furthermore, a through display state that sequentially displays sensed image data is set (step S116). Then, the flow advances to step S119.

In the through display state, data which are sequentially written in the image display memory 24 through the image sensing element 14, A/D converter 16, image processing circuit 20, and memory control circuit 22 are sequentially displayed on the image display unit 28 through the memory control circuit 22 and D/A converter 26, thereby implementing the electronic finder function.

If it is determined in step S113 that the image display ON/OFF switch 66 is set to image display OFF, the processing advances to step S117 to cancel the image display flag. In addition, in step S118, image display of the image display unit 28 is set to the OFF state. Then, the flow advances to step S119.

When image display is OFF, photography is performed by using the optical finder 104 without using the electronic finder function by the image display unit 28. In this case, the power consumed by the image display unit 28 and D/A converter 26, which consume large power, can be reduced. The state of the image display flag is stored in the internal memory of the system control circuit 50 or the memory 52.

In step S119 (FIG. 3A), it is determined whether the shutter switch SW1 is ON. More specifically, it is determined whether the shutter switch is pressed halfway. If it is determined that the shutter switch is OFF, the flow returns to step S103 to repeat the above-described processing.

If it is determined that the shutter switch SW1 is ON, the flow advances from step S119 to step S120. The system control circuit 50 determines the image display flag state stored in its internal memory or the memory 52 (step S120). If the image display flag is set, the display state of the image display unit 28 is set to a freeze display state (step S121). The flow advances to step S122.

In the freeze display state, image data rewrite that is executed for the image display memory 24 through the image sensing element 14, A/D converter 16, image processing circuit 20, and memory control circuit 22 is inhibited. The finally written image data is displayed on the image display unit 28 through the memory control circuit 22 and D/A converter 26, thereby displaying a frozen image on the electronic finder. If the image display flag is canceled, the processing in step S121 is skipped, and the flow advances to step S122.

In step S122, the system control circuit 50 sets the focal length of the photographic lens 10 on the object by executing distance measurement and also decides the F-number and shutter open time (shutter speed) by executing photometry. When the electronic flash is set to the auto mode, whether electronic flash is to be used is also set in the photometry. The distance measurement/photometry processing in step S122 will be described later in detail with reference to FIG. 4.

When the distance measurement/photometry is ended, the processing advances to step S123 to execute red-eye processing in accordance with the electronic flash mode set state and the photometry result. The red-eye processing in step S123 will be described later in detail with reference to FIGS. 11A and 11B.

When the red-eye processing (step S123) is ended, the system control circuit 50 determines the image display flag state stored in its internal memory or the memory 52 (step S124). If the image display flag is set, the display state of the image display unit 28 is set to the through display state (step S125), and the flow advances to step S126. The through display state in step S125 is the same as the through state in step S116 described above.

In step S126, it is determined whether the shutter switch SW2 is ON, i.e., whether the shutter button is fully pressed. If the shutter switch SW2 is OFF, it is determined in step S127 whether the shutter switch SW1 is also released. If the shutter SW1 is also released (OFF), the flow returns to step S103.

If it is determined that the shutter switch SW2 is ON, the processing advances to step S128 to determine whether light projection by the light projecting device 49 corresponding to photographic conditions set instep S123 is executed (step S128). If it is determined that light projection is executed, the light projection is stopped in step S129, and the flow advances to step S130. If light projection is not executed, step S129 is skipped, and the processing advances to step S130.

In step S130, the system control circuit 50 determines the image display flag state stored in its internal memory or the memory 52. If the image display flag is set, fixed image display is displayed on the image display unit 28 in step S131. The flow advances to step S132.

In this fixed image display processing, while encoding and recording processing are being executed after image sensing, a predetermined mark (symbol) representing that the progress of the processing is displayed for the user. When this mark is displayed on the image display unit 28 through the memory control circuit 22 and D/A converter 26, an image with a fixed color is displayed on the electronic finder.

If it is determined in step S130 that the image display flag is canceled, the processing in step S131 is skipped, and the flow advances to step S132.

In step S132, the system control circuit 50 writes the photographed image data in the memory 30 through the image sensing element 14, A/D converter 16, image processing circuit 20, and memory control circuit 22 or from the A/D converter directly through the memory control circuit 22 (exposure processing). In addition, the image data written in the memory 30 is read out by using the memory control circuit 22 and even the image processing circuit 20, as needed, and various kinds of processing operations are executed (development processing). With the exposure processing and development processing, photography processing is executed. The photography processing (step S132) will be described later in detail with reference to FIG. 5.

When the photography processing is ended, the flow advances to step S133 to cause the system control circuit 50 to determine the image display flag state stored in its internal memory or the memory 52. If it is determined that the image display flag is set, quick review display is executed (step S136). In this case, the image display unit 28 is always displayed as the electronic finder even during photography. Quick review display even immediately after photography is also executed.

If it is determined in step S133 that the image display flag is canceled, the quick review flag state stored in the internal memory of the system control circuit 50 or the memory 52 is determined (step S134). If the quick review flag is set, image display of the image display unit 28 is set to the ON state (step S135), and quick review display is executed (step S136).

As described above, the electronic finder function is unnecessary because photography is executed by using the optical finder 104 to save the power. For this reason, even when image display of the image display unit 28 is OFF, a photographed image can automatically be displayed on the image display unit 28 immediately after photography when the quick review function is set by the quick review switch. Accordingly, a convenient function for power saving and photographed image confirmation can be provided.

If it is determined in step S133 that the image display flag is canceled, and it is determined in step S134 that the quick review flag is also canceled, the image display unit 28 is kept in the OFF state, and the flow advances to step S137. In this case, even after photography, the image display unit 28 is kept off, and quick review display is not executed. This use method places importance on power saving by omitting use of the electronic finder function of the image display unit 28 and can be used when confirmation of a photographed image immediately after photography is unnecessary, like when photography is to be continued by using the optical finder 104.

In step S137, the system control circuit 50 reads out the photographed image data written in the memory 30. The system control circuit 50 executes various kinds of image processing by using the memory control circuit 22 and even the image processing circuit 20, as needed. In addition, the system control circuit 50 executes image compression corresponding to the set mode by using the compression/expansion circuit 32. After that, recording processing for writing the image data in the recording medium 200 or 210 is executed (step S137). The recording processing (step S137) will be described later in detail with reference to FIG. 6.

When the recording processing is ended, the processing advances to step S138 to determine whether the shutter switch SW2 is in the pressed state. If it is determined that the shutter switch SW2 is kept in the ON state, the flow advances to step S139 to cause the system control circuit 50 to determine the continuous shooting flag state stored in its internal memory or the memory 52 (step S139). If it is determined that the continuous shooting flag is set (ON), photography is to be continuously executed. The flow returns to step S129 to execute the next photography.

If it is determined in step S139 that the continuous shooting flag is not set, the processing waits until it is determined in step S138 that the shutter switch SW2 is released.

When the recording processing is ended, the shutter switch SW2 is set in the released state. Alternatively, when photographed images are confirmed by continuously executing quick review display by keeping the shutter switch SW2 pressed, and the shutter switch SW2 is released, the processing advances to step S140.

In step S140, the processing waits until a predetermined time elapses. In step S141, the system control circuit 50 determines whether the image display flag is set. If it is determined that the image display flag is set, the display state of the image display unit 28 is set to the through display state in step S143, and the flow advances to step S144. In this case, the through display state can be set in which after a photographed image is confirmed by quick review display on the image display unit 28, sensed image data are sequentially displayed for the next photography.

If it is determined in step S141 that the image display flag is canceled, image display of the image display unit 28 is set to the OFF state in step S142, and the flow advances to step S144. In this case, the photographed image is confirmed by quick review display of the image display unit 28. After that, the function of the image display unit 28 is stopped to save the power. Accordingly, the power consumed by the image display unit 28 and D/A converter 26, which consume large power, can be reduced.

In step S144, it is determined whether the shutter switch SW1 is in the ON state. If it is determined that the shutter switch SW1 is ON, the flow returns to step S126 to prepare for next photography. If it is determined that the shutter switch SW1 is released once, the system control circuit 50 returns from step S144 to step S103 to end the series of photographic operations.

The main processing in the embodiment has been described above. The processing operations in steps S122, S123, S132, and S137 in FIGS. 3A and 3B will be described next in detail.

<Distance Measurement/Photometry Processing (Step S122)>

Figure 4:
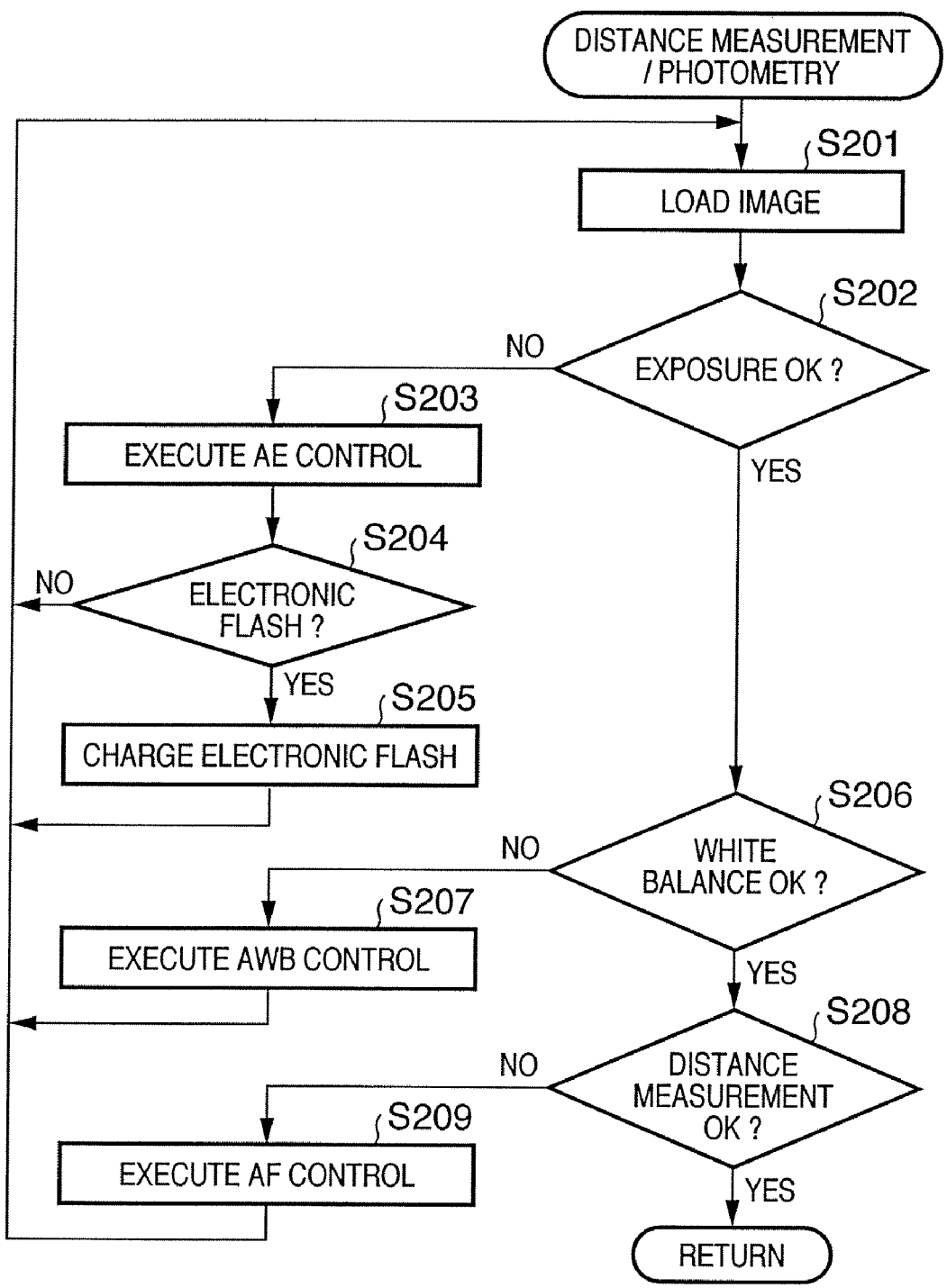
FIG. 4 is a flowchart of a distance measurement/photometry routine according to the first embodiment.

FIG. 4 is a flowchart showing details of the distance measurement/photometry processing in step S122 in FIG. 3A. This processing will be described below with reference to FIG. 4.

The system control circuit 50 reads out the charge signal from the image sensing element 14 and sequentially loads photographed image data to the image processing circuit 20 through the A/D converter 16 (step S201). The image processing circuit 20 executes predetermined arithmetic processing to be used for AE (Auto Exposure) processing, EF (Electronic Flash pre-emission) processing, and AF (Auto Focus) processing of TTL (Through The Lens) scheme by using the sequentially loaded image data.

In each processing, a necessary number of specific necessary parts are extracted from all the photographed pixels and used for arithmetic processing. Accordingly, in each of the AE, EF, AWB, and AF processing of TTL scheme, optimum arithmetic processing can be executed for each of different modes such as a center-weighted mode, average mode, and evaluation mode.

By using the arithmetic result by the image processing circuit 20, the system control circuit 50 causes the exposure control unit 40 to execute AE control (step S203) until it is determined that the exposure (AE) is appropriate (step S202).

In addition, the system control circuit 50 determines by using the measurement data obtained by AE control whether the electronic flash is necessary (step S204). If YES in step S204, a flash flag is set, and the electronic flash 48 is charged (step S205). Step S204 is executed in an auto flash mode. If setting is explicitly done not to drive the electronic flash, NO is always determined in step S204.

If YES in step S202, the measurement data and/or set parameters are stored in the internal memory of the system control circuit 50 or the memory 52.

By using the arithmetic result by the image processing circuit 20 and the measurement data obtained by AE control, the system control circuit 50 causes the image processing circuit 20 to adjust parameters for color processing to execute AWB control (step S207) until it is determined that the white balance (AWB) is appropriate (step S206).

If YES in step S206, the measurement data and/or set parameters are stored in the internal memory of the system control circuit 50 or the memory 52.

By using the measurement data obtained by AE control and AWB control, the system control circuit 50 causes the distance measurement control unit 42 to execute AF control (step S209) until it is determined that distance measurement (AF) is appropriate (step S208).

If YES in step S208, the measurement data and/or set parameters are stored in the internal memory of the system control circuit 50 or the memory 52. This distance measurement/photometry processing routine (step S122 in FIG. 3A) is ended, and the flow returns to the main routine.

<Red-Eye Processing (Step S123)>

Figure 11A:
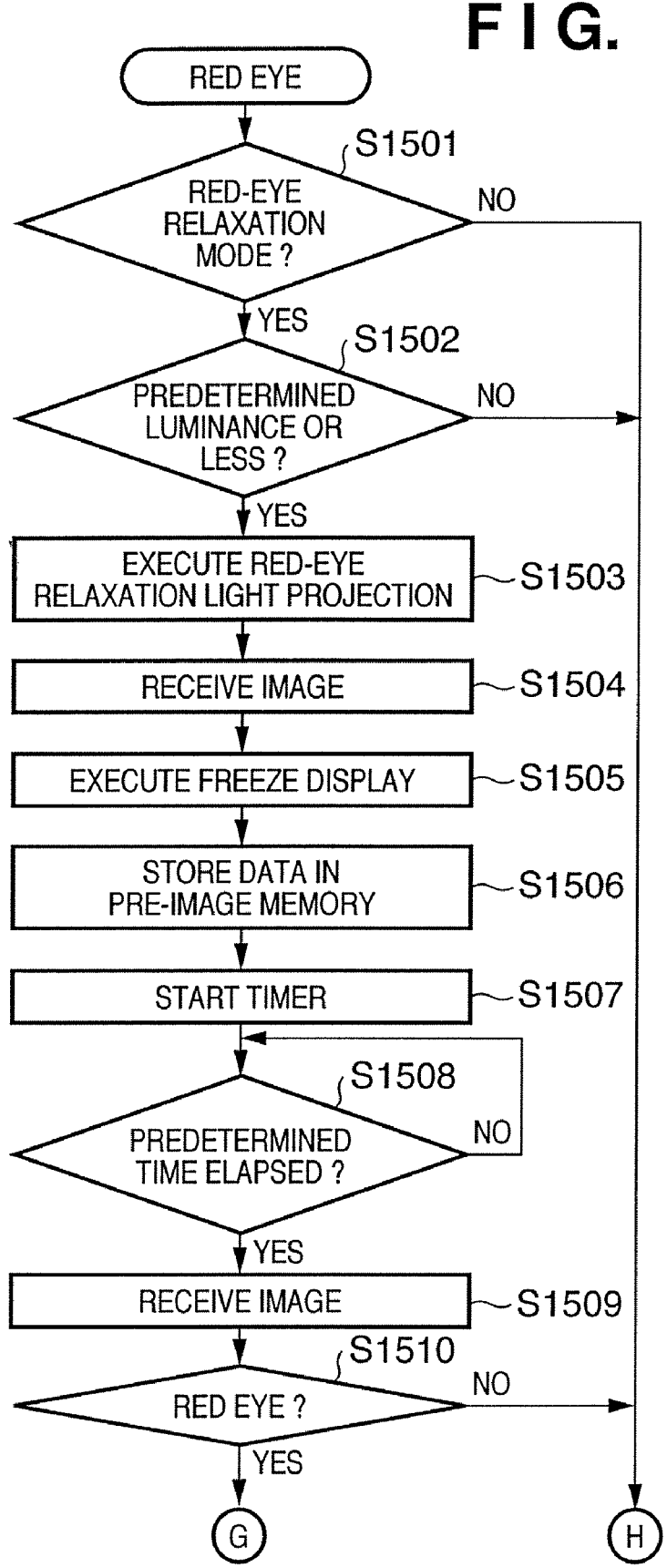
FIGS. 11A and 11B are flowcharts of a red-eye processing routine according to the first embodiment.
Figure 11B:
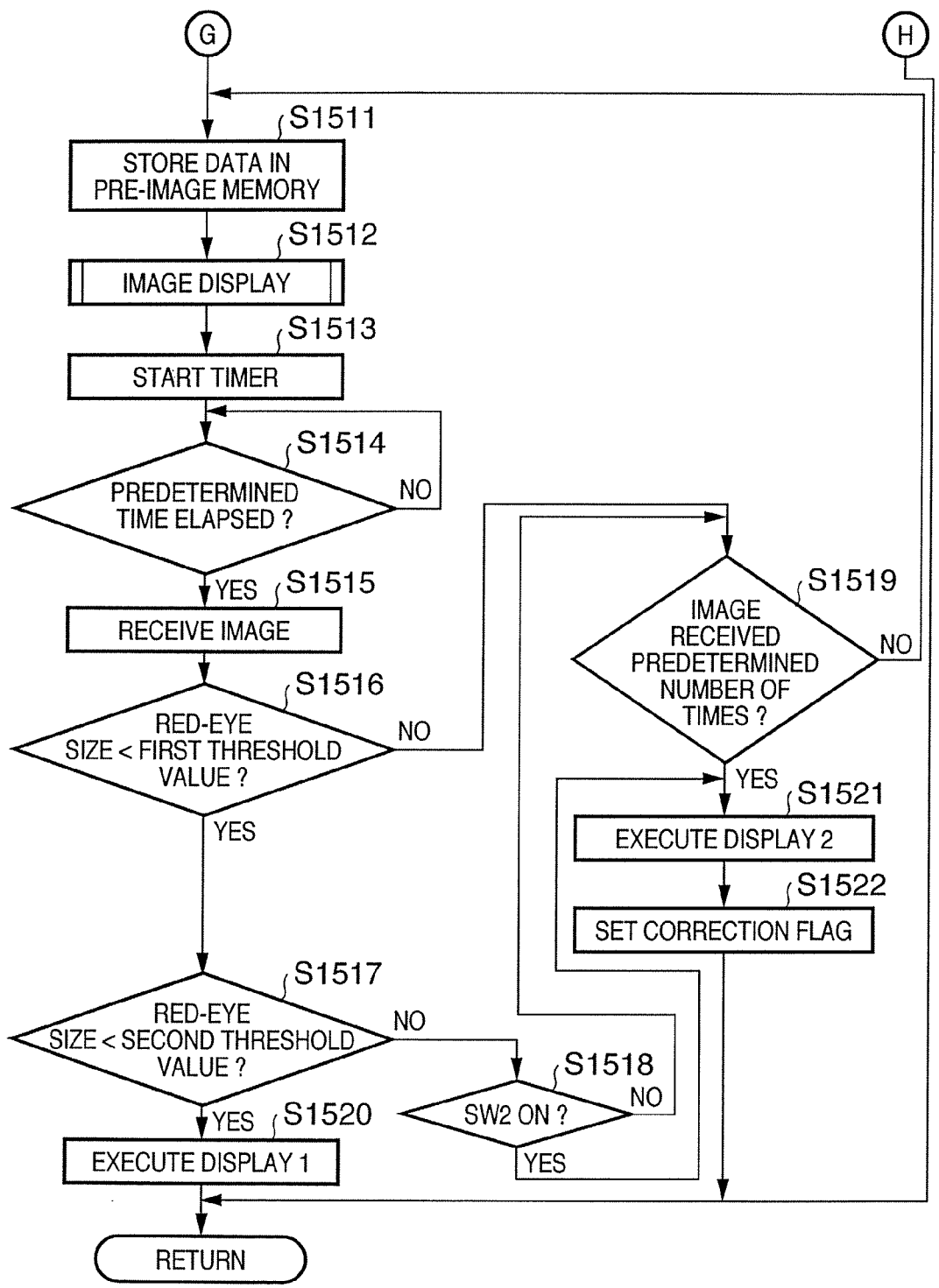

The red-eye processing according to this embodiment in step S123 of FIG. 3A will be descried next in detail with reference to the flowcharts shown in FIGS. 11A and 11B.

First, in step S1501, the system control circuit 50 determines whether the electronic flash set state by the electronic flash mode switch 65 is the "red-eye relaxation mode". If NO in step S1501, the processing is ended, and the flow returns to the main routine and advances to step S124 in FIG. 3A.

If YES in step S1501, it is determined on the basis of the result of photometry in step S122 in FIG. 3A whether the luminance is equal to or lower than a predetermined luminance that requires red-eye relaxation. If NO in step S1502, it is determined that red-eye processing is unnecessary, and the flow returns to step S124 in FIG. 3A. If YES in step S1502, the processing advances from step S1502 to step S1503.

In step S1503, the light projecting device 49 starts projecting light from the red-eye light projector. After the start of light projection, an image is sensed and written in the image display memory 24 through the image sensing element 14, A/D converter 16, image processing circuit 20, and memory control circuit 22 (step S1504). A frozen image is displayed (step S1505). The data recorded in the image display memory 24 is transferred to the pre-image display memory 27 (step S1506).

When this transfer is done, the flow advances to step S1507 to start time counting. The processing waits until it is determined in step S1508 that a predetermined time (0.2 sec in this embodiment) has elapsed. If YES in step S1508, an image is received again and written in the image display memory 24 (step S1509). The image data in the image display memory 24 is compared with the image data which is stored in the pre-image display memory 27 a predetermined time before (0.2 sec before) to determine the presence/absence of a red eye (step S1510).

The processing in step S1510 will be described in more detail.

The photographed image immediately after the start of light projection in the red-eye processing is stored in the pre-image display memory 27. In this case, the pupil diameter of the object (e.g., human) is maximum, as indicated by 1141 in FIG. 14. The light amount that reaches the retina is maximum (the brightness of a red eye is highest). In addition, the red-eye diameter can be largest. To the contrary, the image stored in the image display memory 24 is sensed after the elapse of the predetermined time from the start of red-eye light projection. Hence, the pupil diameter of the object in the image is small. This appears as a change in color, as indicted by 1142 in FIG. 14. In step S1510, the images 1141 and 1142 are compared to determine the presence/absence of a red eye.

More specifically, the brightness and diameter of a red eye change between the image data in the image display memory 24 and that in the pre-image display memory 27 because the pupil diameters are different. This also appears in the image data as a difference. Pixels having this difference can be specified as portions where a red eye is generated. In addition, the brightness of the R component of the RGB data of the pupil portion changes depending on the degree of the red eye. Hence, when the R component data in the image data are compared, the red eye can be detected.

Figure 14:
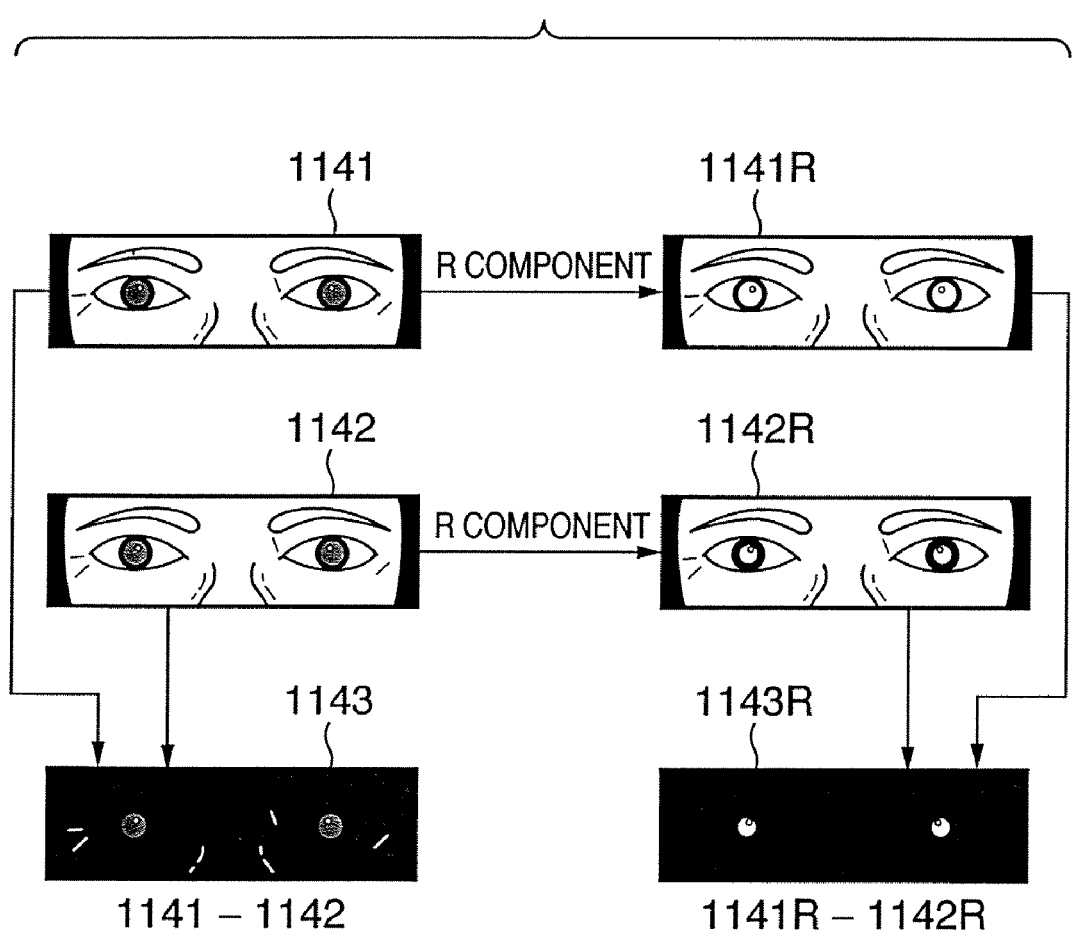
FIG. 14 is a view for explaining the principle of red-eye detection in the first embodiment.

In this embodiment, image data 1141R is generated by causing the memory control circuit 22 to extract R component data from the image data 1141 shown in FIG. 14. In addition, image data 1142R is generated by extracting the R component from the image data 1142. the image data 1142R is subtracted from the image data 1141R to generate a differential image 1143R.

An image 1143 shown in FIG. 14 simply represents the difference between the image 1141 and the image 1142. As is apparent from the image 1143, the difference has or can have a difference for portions except the pupils. More specifically, since the accuracy is too low to specify the eye positions, a false portion may be determined as an eye. To the contrary, in the differential image 1143R for only the R component, parts other than the red eye are removed. Hence, the coordinate positions and eye size can accurately be detected.

The processing in step S1510 has been described above. If NO in step S1510, the processing is ended, and the flow returns to step S124 in FIG. 3A.

If YES in step S1510, the data recorded in the image display memory 24 is written in the pre-image display memory 27 in step S1511. Predetermined image display is done on the basis of the image data received and stored in the image memory 24 in step S1509. This image display will be described later in detail with reference to FIG. 10.

Then, the processing advances to step S1513 to start counting a predetermined time (0.2 sec in this embodiment) again. The processing waits until the predetermined time elapses in step S1514. If YES in step S1514, an image is received again and written in the image display memory 24 in step S1515. As a result, the latest sensed image is stored in the image display memory 24, and an image predetermined time before is stored in the pre-image display memory 27.

In step S1516, it is determined on the basis of the coordinate positions (coordinate positions in the image) of the red-eye region detected in step S1510 whether the diameter of the region of the red eye (the portion where the value of the R component is larger than a predetermined value) in the image display memory 24 is smaller than a first predetermined size (first threshold value). The threshold value as the criterion is a value representing that photography can be performed in this state without generating any sense of incompatibility in a photo with the red eye.

Figure 8:
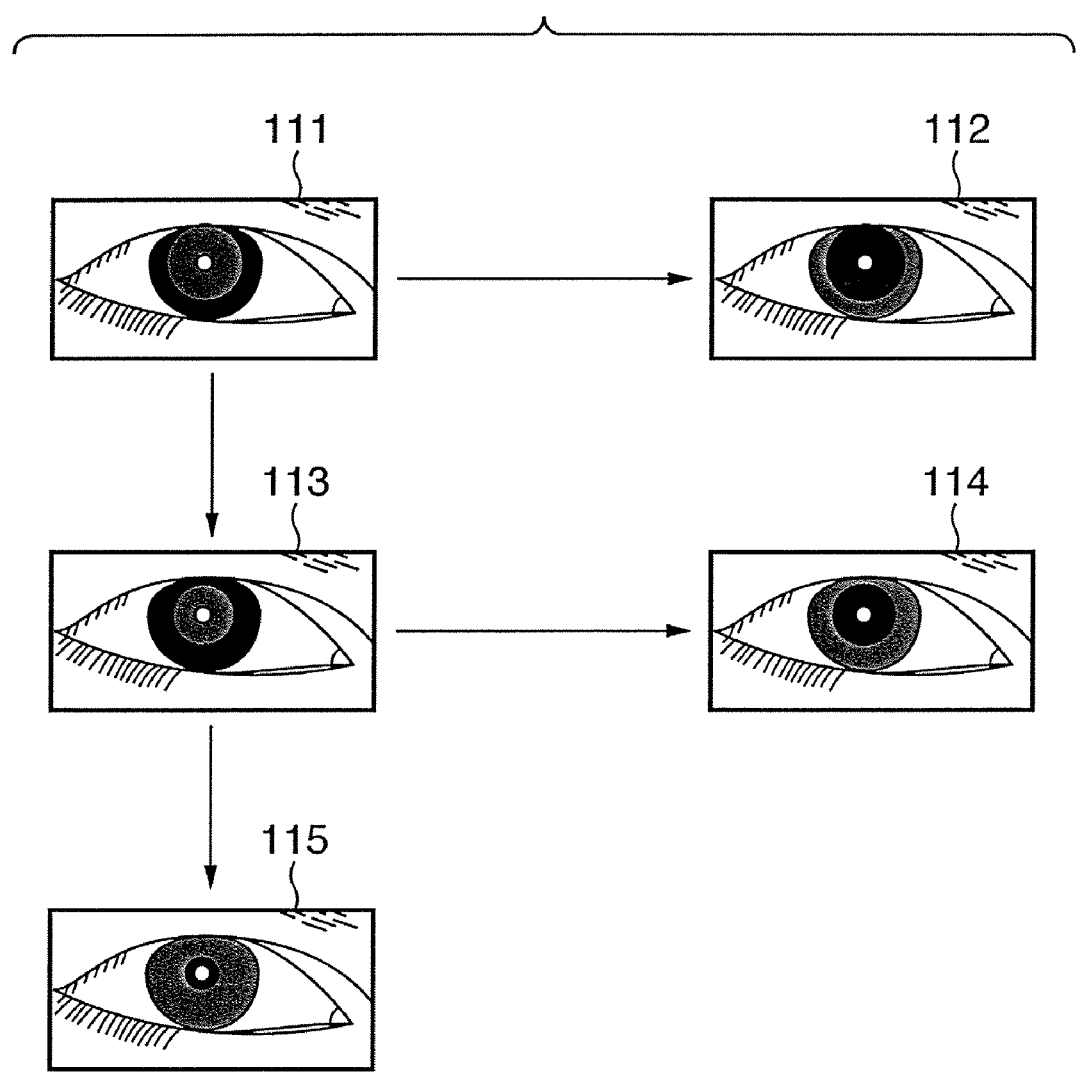
FIG. 8 is a view showing a red-eye generated state.

This corresponds to, e.g., an image 113 shown in FIG. 8 in which the diameter of the red eye is about ½ that of the iris or about 4 mm or less. The iris can be detected from the characteristic feature of the image around the red eye or the white portion (bright) and iris portion (dark) of the eye on the basis of the above-described red-eye region detection result. The diameter of the red eye can be predicted from the focal length and distance measurement result (if the simplicity of processing is taken into consideration, the processing may be done on the basis of the red-eye diameter (or area) immediately after the start of red-eye light projection in place of the above-described calculation).

If YES in step S1516, it is determined in step S1517 whether the red-eye diameter is smaller than the second predetermined size (second threshold value). The second threshold value is used as a criterion to determine whether red-eye correction processing is to be executed and also as a criterion to end the red-eye processing. In this embodiment, the second threshold value is set to ⅓ (⅑ in area) the iris diameter (the initial diameter in red-eye detection).

If NO in step S1516, i.e., if it is determined that a sense of incompatibility can be generated at a high probability after red-eye correction, the processing advances to step S1519 to determine whether the image is received a predetermined number of times. If NO in step S1519, processing from step S1511 is repeated. As for the predetermine number of times, generally, the red-eye relaxation effect is supposed to be large in a time of about 1.2 sec. In this embodiment, the sensed image reception interval (predetermined time) is set to about 0.2 sec. Hence, the predetermined number of times is 6. To further increase the effect, the number of times is set to 10, i.e., the maximum red-eye relaxation light projection time is set to 2 sec. That is, even if NO in step S1516, the red-eye relaxation light projection is executed for 2 sec at maximum.

Figure 9:
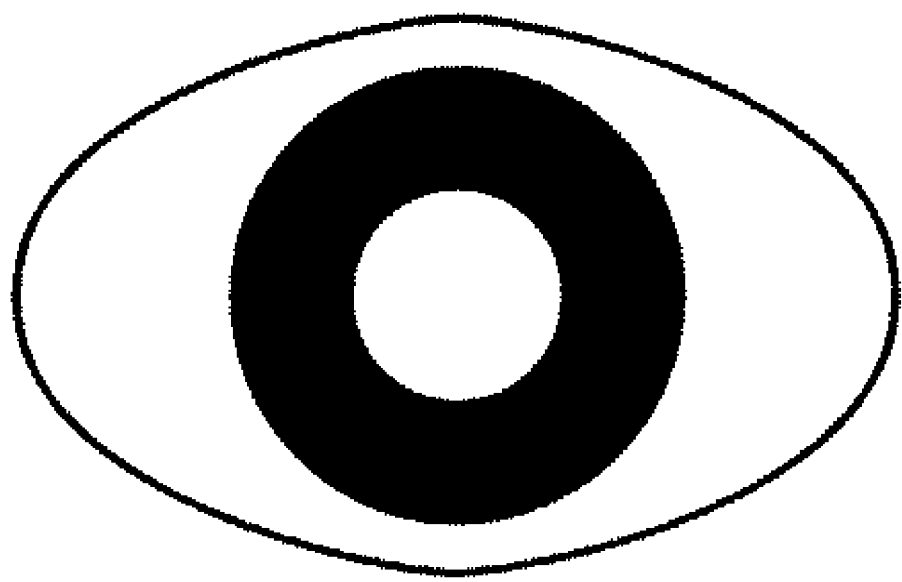
FIG. 9 is a view of the red-eye indicator of the image sensing apparatus.

If NO is determined in step S1516 continuously 10 times, the processing advances to step S1521 to display, on the image display unit 28, a mark (symbol image) as shown in FIG. 9 to indicate that the processing for correcting the red eye is to be executed, thereby notifying the user of red-eye correction processing. A correction flag representing that the red-eye correction is to be executed is set to ON in step S1522, and the processing is ended. The correction flag is set to OFF in the initial state and at the end of red-eye correction processing.

If YES in step S1516, i.e., the red-eye diameter is equal to or smaller than ½ the iris diameter, and NO in step S1517, i.e., the red-eye diameter is larger than ⅓ the iris diameter, it is determined in step S1518 whether the shutter switch SW2 is ON. That is, it is determined whether the user inputs an instruction for sensing and recording of a still image. If NO in step S1518, the flow advances to step S1519. The above processing is repeated until it is determined that the image is received a predetermined number of times (10 times at maximum). However, if YES in step S1518, the processing advances to step S1521 to put a higher priority on the user request and display the mark (FIG. 9) representing correction on the image display unit 28. In step S1522, the correction flag is set to ON.

As is apparent from FIG. 14, when the red-eye diameter is equal to or larger than the first threshold value, whether the shutter switch is ON is not determined. Photography is not permitted unless it is determined that the image is received a predetermined number of times.

There are two routes to step S1521, i.e., a route when NO in step S1516 and a route when NO in step S1517. In the former case, the red-eye diameter is kept relatively large, i.e., an image 112 shown in FIG. 8 is readily obtained. In the latter case, image sensing can be executed without any sense of incompatibility by correcting the red-eye diameter, i.e., an image 114 with unnoticeable red eyes shown in FIG. 8 is obtained. Hence, the mark shown in FIG. 9 is changed depending on the route. For example, if NO in step S1516, and the processing advances to step S1521, a red mark is displayed. If NO in step S1517, and the processing advances to step S1521, a yellow mark is displayed.

When it is determined in step S1517 that the red-eye diameter is equal to or smaller than ⅓ the iris diameter, the correction flag is kept off, and the mark shown in FIG. 9, which represents that red-eye correction is unnecessary, is displayed in green. In this case, an image 115 shown in FIG. 8 is obtained.

In the above example, the level of processing to be executed is indicated by changing the color of the mark. Instead, the shape of the mark may be changed. The mark may be displayed only when red-eye correction is to be executed. Alternatively, the above-described methods may be combined.

In the above embodiment, the red-eye diameter is ½ or ⅓ of the iris diameter. However, this is merely an example, and the present invention is not limited to this. To simplify the processing, not the iris diameter but the red-eye relaxation diameter at the initial stage of red-eye processing may be used as a criterion. The degree of reduction of red eyes may be determined by counting the number of pixels for which the difference value in R component between the two images is larger than a predetermined value, instead of obtaining the diameter.

As described above, in the red-eye processing of this embodiment, when the shutter switch SW1 is ON, light projection for red-eye relaxation is started. While this red-eye relaxation light projection continues, image sensing is repeated at an interval of 0.2 sec, thereby storing and holding two latest image data in the image display memory 24 and pre-image display memory 27. The R components are compared to detect the position and size of a red eye. The two images are photographed under the same light projection environment so that the two images are guaranteed to have almost the same brightness. For this reason, the position of the red eye and a change in red-eye size from the start of light projection can accurately be detected. In addition, the user can know whether red-eye correction is to be executed and the degree of influence of the red-eye correction.

Figure 10:
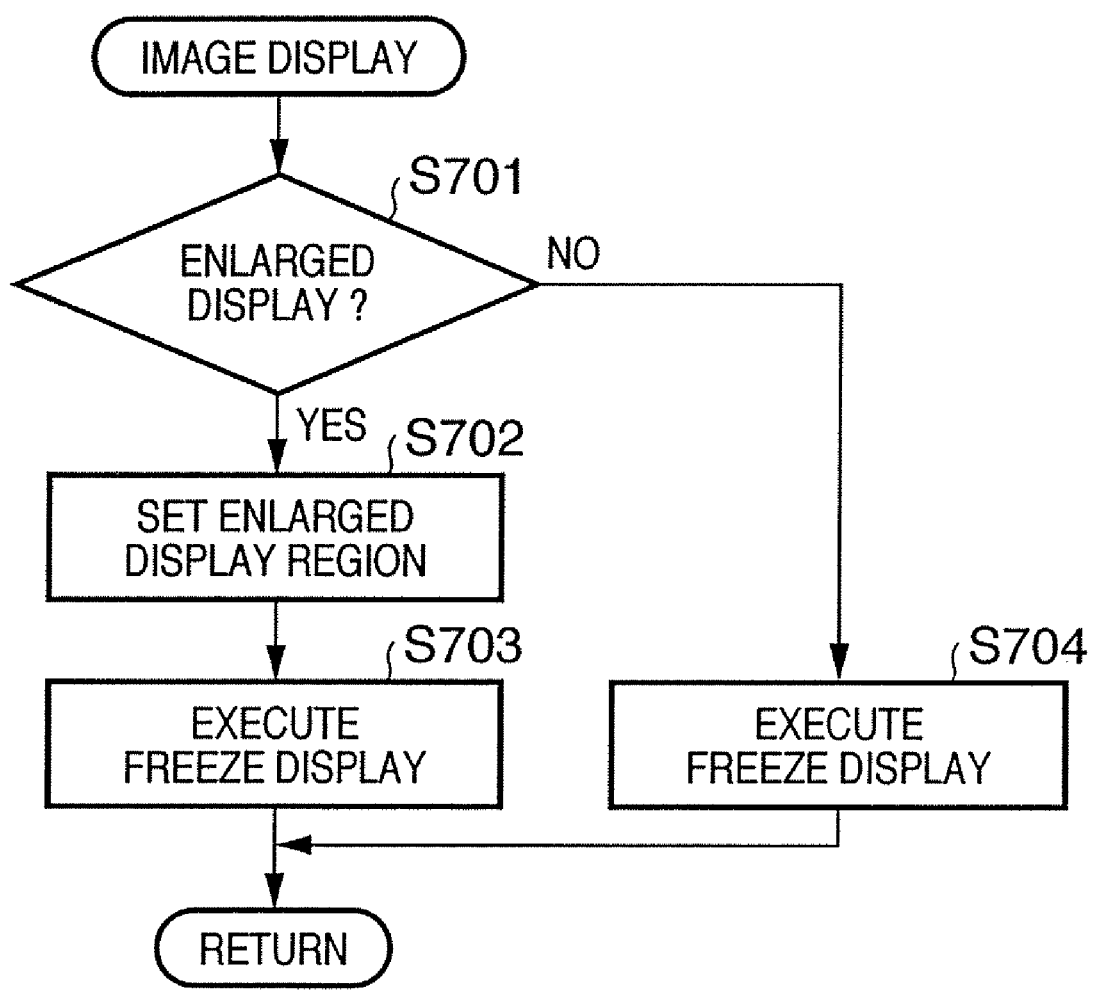
FIG. 10 is a flowchart for explaining image display.

The image display processing in step S1512 in the above description will be described with reference to the flowchart shown in FIG. 10.

First, in step S701, the system control circuit 50 checks the enlarged display set state of the operation unit 70. If enlarged display is set, the enlarged display region is set (step S702). The enlarged display region includes the red-eye portion detected by the above-described red-eye processing. When the enlarged display region is set, the set region is displayed by freeze display (step S703). FIG. 7C shows a display example at this time. If enlarged display is not set, the entire image is displayed by freeze display (step S704). FIG. 7B shows a display example at this time.

Determination of the presence/absence of a red eye in the red-eye processing of this embodiment, and determination of the size of the red eye will be described below in more detail with reference to FIG. 19.

Figure 19:
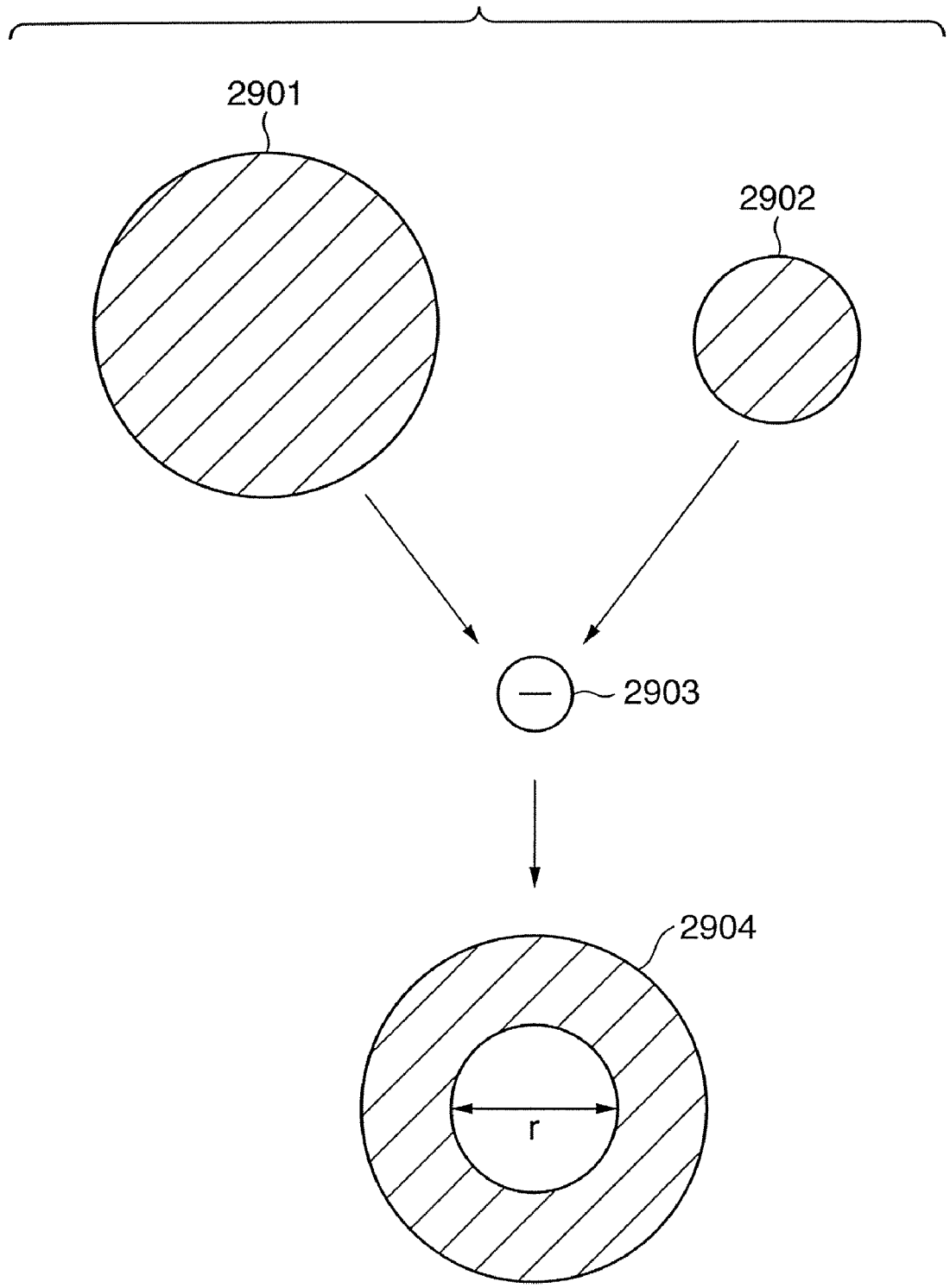
FIG. 19 is a view for explaining the principle of detection of the position and size of a red eye.

Referring to FIG. 19, reference numeral 2901 denotes an R component of an image containing a red-eye portion immediately after the start of red-eye relaxation light projection; and 2902, an R component of the image containing the red-eye portion after Δt during red-eye relaxation light projection (a portion whose R component has a large value is indicated as a hatched portion for the illustrative convenience).

When the image 2902 is subtracted from the image 2901 by a subtracter (subtraction processing) 2903, a differential image 2904 is obtained. The difference in R component between the red-eye portion of the image 2901 and that of the image 2902 is small. Hence, when the differential image is binarized on the basis of a predetermined threshold value, a ring-shaped image is obtained, like the image 2904. As is apparent from the image 2904, a circular portion indicated by an inner diameter r is the current red-eye region (or the size of the pupil). Red eyes that appear in two images immediately after the start of red-eye relaxation light projection have difference sizes. Hence, the difference in R component can conspicuously be detected, as shown in FIG. 19. Hence, the position can accurately be determined. When light projection is continued, the human pupil gradually becomes small and converges to a predetermined size. More specifically, the red-eye regions in two images that continue in terms of time have the same size. In other words, the outer diameter of the ring-shaped image as the differential image shown in FIG. 19 becomes small. At the same time, the thickness of the ring also becomes small. When contraction of the pupil converges, detection of the ring-shaped image is impossible. Hence, "r" at each stage is determined as the red-eye diameter (red-eye size), and the central position is determined as the coordinate position of the red eye. However, when contraction of the red eye converges, and no differential image can be detected, the immediately preceding red-eye diameter and position are determined as the final position.

To simplify the processing, the area (the number of pixels) of the ring-shaped hatched portion shown in FIG. 19 is counted, and the counted number of pixels is compared with the threshold value in step S1516 or S1517 in FIG. 14.

<Photography Processing (Step S132)>

Figure 5:
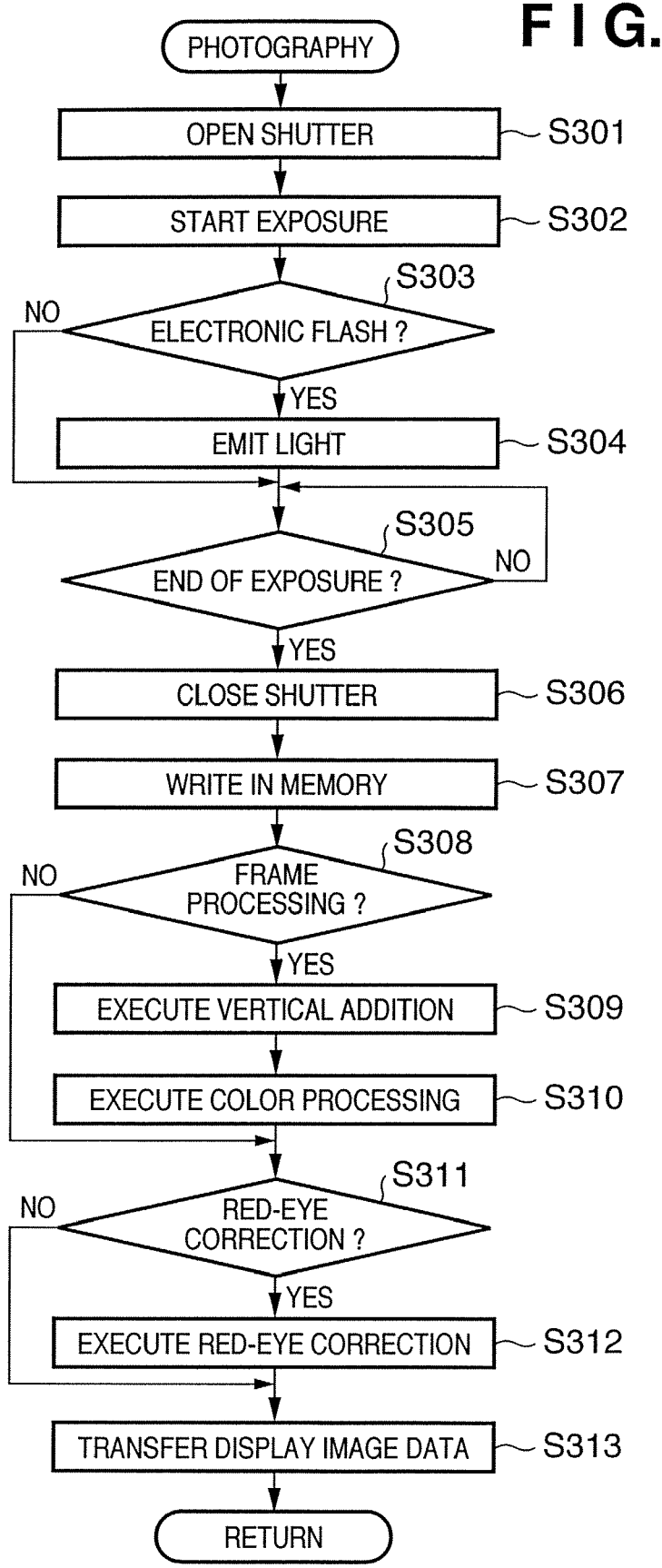
FIG. 5 is a flowchart of a photography routine according to the first embodiment.

The photography processing in step S132 shown in FIG. 3B will be described next with reference to the flowchart shown in FIG. 5. Note that this processing is executed when it is determined in step S126 in FIG. 3A that the shutter switch SW2 is ON.

In accordance with the photometry data stored in the internal memory of the system control circuit 50 or the memory 52, the system control circuit 50 causes the exposure control unit 40 to start exposure of the image sensing element 14 by opening the shutter 12 having a stop function in accordance with the F-number (steps S301 and S302).

In step S303, it is determined on the basis of the electronic flash flag whether the electronic flash 48 is necessary. If YES in step S303, the electronic flash 48 is caused to emit light (step S304).

In step S305, the system control circuit 50 waits for the end of exposure of the image sensing element 14 in accordance with the photometry data. If it is determined that exposure is ended, the shutter 12 is closed (step S306). A charge signal is read out from the image sensing element 14. The data of the photographed image is written in the memory 30 through the A/D converter 16, image processing circuit 20, and memory control circuit 22 or directly from the A/D converter 16 through the memory control circuit 22 (step S307).

It is determined in step S308 on the basis of the set photography mode whether frame processing needs to be executed. If YES in step S308, the system control circuit 50 reads out the image data written in the memory 30 by using the memory control circuit 22 and the image processing circuit 20 as needed, sequentially executes vertical addition processing (step S309) and color processing (step S310), and stores the image data in the memory 30 again.

The flow advances to step S311 to check whether the correction flag in the above-described red-eye processing is ON to determine whether red-eye correction is to be executed. If YES in step S311, the flow advances to step S312 to execute red-eye correction for the sensed image stored in the memory 30. In this red-eye correction processing, the brightness of the R component of the image data of the pupil portion with a red eye is decreased in accordance with the information of the coordinate position and size of the red eye obtained in the above red-eye processing.

In step S313, the system control circuit 50 reads out the image data from the memory 30 and transfers the display image data to the image display memory 24 through the memory control circuit 22. Then, the processing is ended.

<Recording Processing (Step S137)>

Figure 6:
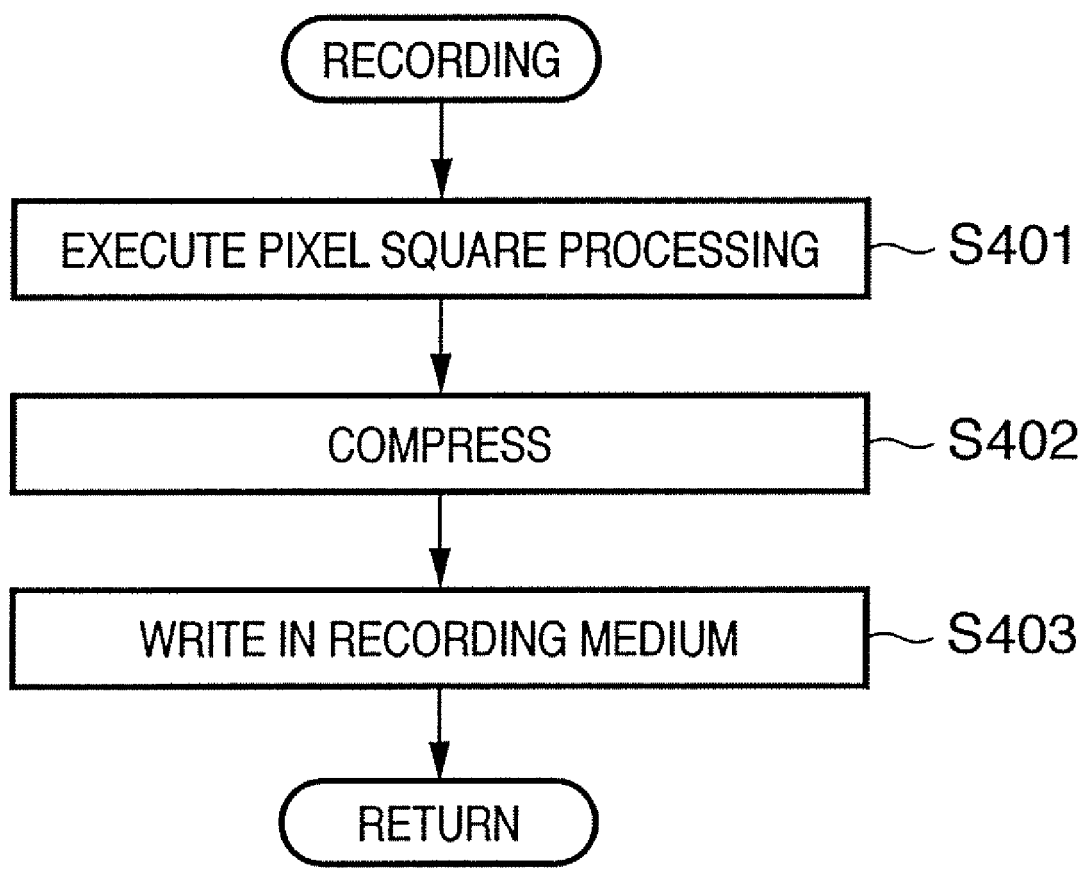
FIG. 6 is a flowchart of a recording routine according to the first embodiment.

The recording processing in step S137 shown in FIG. 3B will be described next with reference to the flowchart shown in FIG. 6.

First, in step S401, the system control circuit 50 controls the memory control circuit 22 and the image processing circuit 20 as needed to read out the photographed image data written in the memory 30, execute pixel square processing for interpolating the vertical-to-horizontal pixel ratio of the image sensing element 14 to 1:1, and written the image data in the memory 30 again.

In step S402, the image data written in the memory 30 is read out. Image compression processing corresponding to the set mode is executed by controlling the compression/expansion circuit 32. In step S403, the compression-coded data (generally, JPEG data) is written in the recording medium 200 or 210 such as a memory card or compact flash card through the interface 90 or 94 and the connector 92 or 96.

When the write in the recording medium is ended, the recording processing (step S137) is ended, and the flow returns to step S138 in FIG. 3B.

As described above, according to this embodiment, when the two-stoke shutter button is at the first stroke position, preliminary image sensing for detecting the position and size of a red eye is repeated while executing red-eye relaxation light projection. Since the preliminary image sensing conditions can substantially be the same, the transition of the position and size of the red eye can accurately be detected. The red-eye relaxation light projection acts to reduce the pupil size of the object. In addition, the user can know whether red-eye correction is to be finally executed and the influence of the red-eye correction on the image quality.

When the shutter button is in the second stroke position, i.e., when the shutter button is fully pressed, the necessity of red-eye correction obtained at the first stroke position is determined. Only when red-eye correction is necessary, the R component of the region based on the position and size of the correction target is corrected. Hence, R component attenuation processing (correction processing) is executed for only the minimum and necessary region. In other words, red-eye correction is not executed for a region whose size is more than necessary. Hence, a natural image without any sense of incompatibility can be recorded.

According to this embodiment, red-eye relaxation light projection by the light projecting device 49 is executed. That the red-eye relaxation effect is obtained (the red-eye diameter is smaller than the first threshold value) is detected, and release is permitted. Release is not permitted before the red-eye relaxation effect is obtained. With this arrangement, photography with a sufficient red-eye relaxation effect can be performed.

Since the state of the red eye is displayed on the image display unit 28, photography can be performed while confirming the state of the red eye. With this red-eye processing, the red eye in the photographed image can appropriately be corrected. Even when the correction region is large, the user is notified of it in advance and can be prevented from feeling any sense of incompatibility. When the region where the red eye is detected is enlarged and displayed on the image display unit 28, the effect can be increased.

In the above embodiment, in red-eye processing, two latest images are stored in the image display memory 24 and pre-image display memory 27. Instead, image data immediately after the start of red-eye processing may be stored in the pre-image display memory 27. An image sensed at a predetermined time interval may be stored in the image display memory 24. Accordingly, the two images are compared to determine the reduction ratio to the initial red-eye size.

In the above embodiment, when the iris size is 1, and the red-eye diameter is ½ or ⅓ the iris size, the state of red-eye relaxation is detected. In this case, the iris size is obtained on the basis of the distance between the object and the camera. Generally, as the distance between the camera and the object increases, the accuracy of distance measurement degrades. Hence, in the above embodiment, the distance measurement may function only within a preset distance. If the distance is larger, a warning mark or the like may be displayed.

Second Embodiment

The second embodiment of the present invention will be described next.

Figure 13:
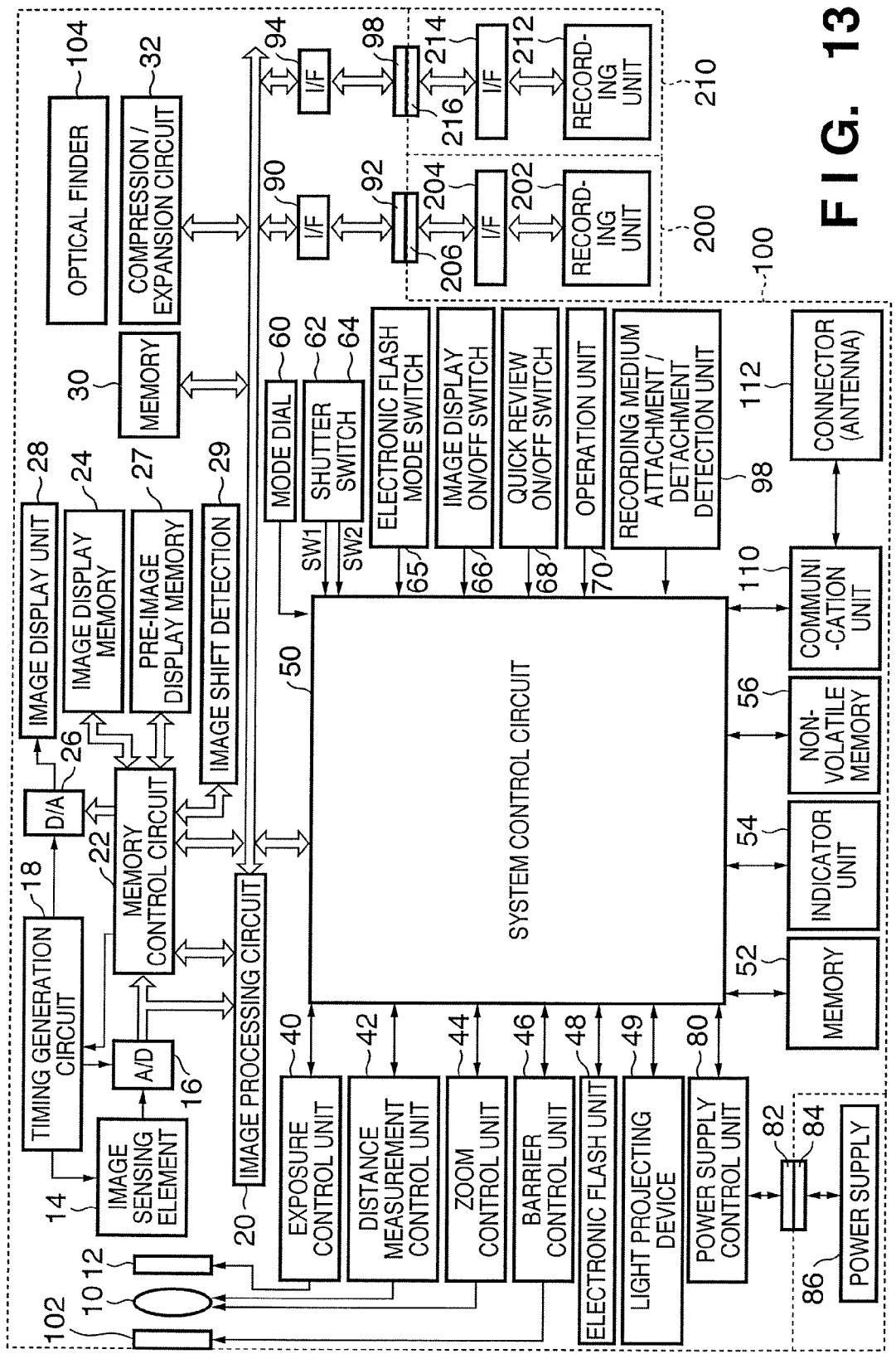
FIG. 13 is a block diagram of a digital still camera according to the second embodiment.

FIG. 13 is a block diagram of a digital camera apparatus according to the second embodiment. This arrangement is based on that shown in FIG. 1 (the arrangement of the first embodiment). Different components and characteristic features will be described below.

The arrangement of the second embodiment is different from that in FIG. 1 in that an image shift detection unit 29 is arranged. The image shift detection unit 29 detects the coordinate moving amount of an image and that of an object by photographer's camera shake from two images which continue in terms of time.

<Operation Processing Flow>

Figure 12A:
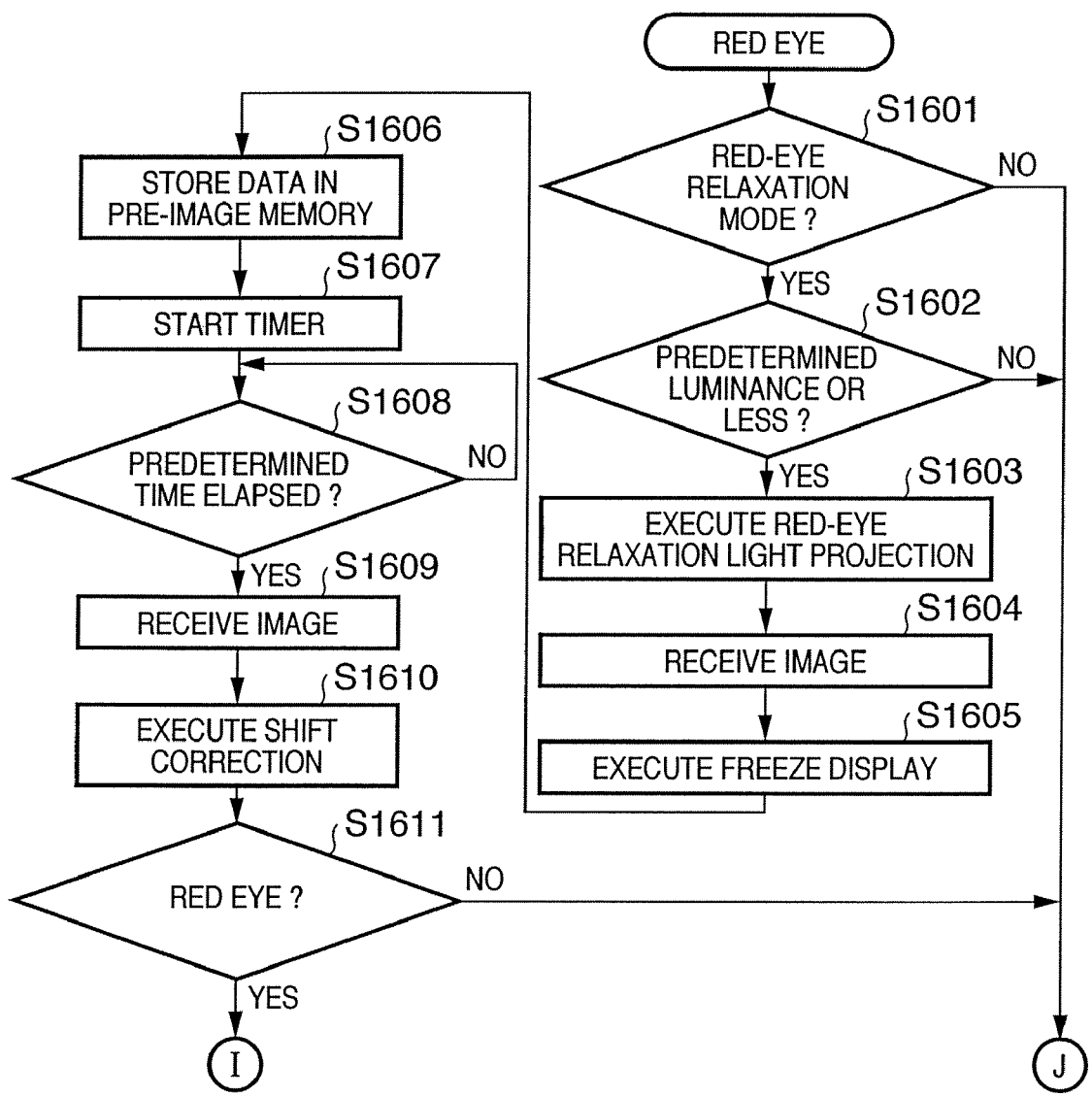
FIGS. 12A and 12B are flowcharts of a red-eye processing routine according to the second embodiment.
Figure 12B:
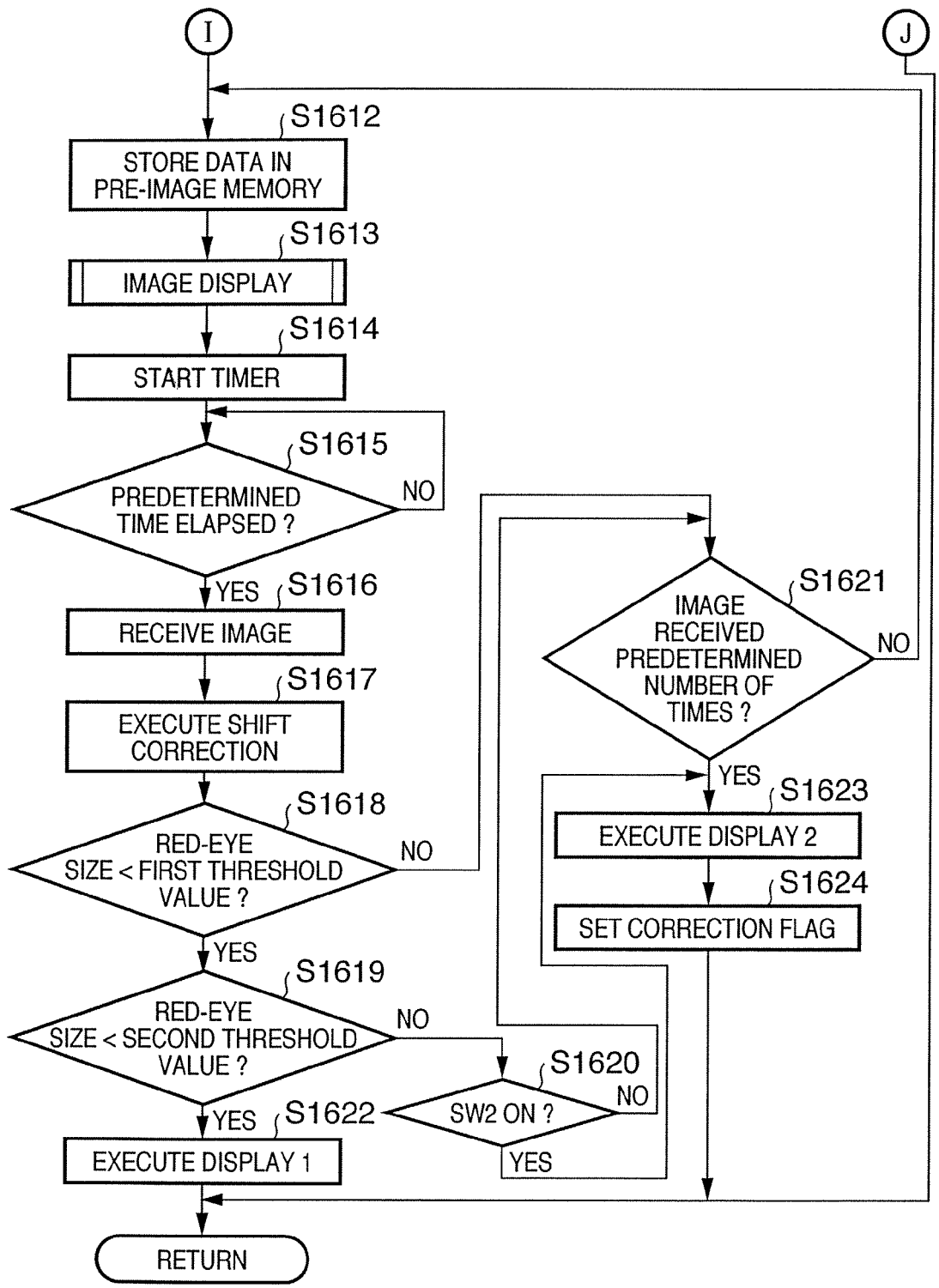

The red-eye processing (step S123 in FIG. 3A) according to the first embodiment is executed in the order of processing operations shown in FIGS. 11A and 11B. Red-eye processing according to the second embodiment is executed in accordance with the flowcharts shown in FIGS. 12A and 12B. This will be described below with reference to FIGS. 12A and 12B.

A system control circuit 50 checks whether the electronic flash set state by an electronic flash mode SW 65 is the red-eye relaxation mode (step S1601). If NO in step S1601, the red-eye processing is ended, and the flow returns to step S124 in FIG. 3A. If YES in step S1601, it is determined on the basis of the photometry result in step S122 in FIG. 3A whether the luminance is equal to or lower than a predetermined luminance that requires red-eye relaxation (step S1602). If NO in step S1602, it is determined that red-eye processing is unnecessary, and the flow returns to step S124 in FIG. 3A.

If YES in step S1602, the flow advances to step S1603 to drive a light projecting device 49 to start projecting light from a red-eye light projector 304 (FIG. 7A). Processing executed while light projection is being executed will be described below.

In step S1604, sensed digital image data is written in an image display memory 24 through an image sensing element 14, image processing circuit 20, and memory control circuit 22. A frozen image is displayed (step S1605). The data recorded in the image display memory 24 is transferred to a pre-image display memory 27 (step S1606). Time counting is started (step S1607). In step S1608, the processing waits until a predetermined time (0.2 sec in this embodiment) elapses. If YES in step S1608, an image is received again and written in the image display memory 24 (step S1609). On the basis of the image data in the image display memory 24 and that in the pre-image display memory 27, the image shift detection unit 29 detects a coordinate shift of the image data in the image display memory 24 with respect to the image data (image data predetermined time before) in the pre-image display memory 27, which is caused by camera shake and object movement (step S1610). The image shift detection unit 29 obtains the moving amount and direction of a moving body in each image by using a motion vector method represented by a known matching method or density gradient method, and a detailed description thereof will be omitted.

The flow advances to step S1611 to match the coordinates of the pixels of the image data in the image display memory 24 and that in the pre-image display memory 27 on the basis of the shift amount between the image data in the image display memory 24 and the image data in the pre-image display memory 27. The two images are compared to determine the presence/absence of a red eye.

The processing in step S1611 will be described in more detail.

The photographed image immediately after the start of light projection in the red-eye processing is stored in the pre-image display memory 27. In this case, the pupil diameter of the object (e.g., human) is maximum, as indicated by an image 1141 in FIG. 14. IN addition, the red-eye diameter can be largest. To the contrary, the image stored in the image display memory 24 is sensed after the elapse of the predetermined time from the start of red-eye light projection. Hence, the pupil diameter of the object in the image is small. This appears as a change in color, as indicted by 1142 in FIG. 14. In step S1611, the images 1141 and 1142 are compared to determine the presence/absence of a red eye.

More specifically, the brightness and diameter of a red eye change between the image data in the image display memory 24 and that in the pre-image display memory 27 because the pupil diameters are different. This also appears in the image data as a difference. Pixels having this difference can be specified as portions where a red eye is generated. In addition, the brightness of the R component of the RGB data of the pupil portion changes depending on the degree of the red eye. Hence, when the R component data in the image data are compared, the red eye can be detected.

In this embodiment, image data 1141R is generated by causing the memory control circuit 22 to extract R component data from the image data 1141 shown in FIG. 14. In addition, image data 1142R is generated by extracting the R component from the image data 1142. the image data 1142R is subtracted from the image data 1141R to generate a differential image 1143R. The images 1141R and 1142R rarely have no difference in brightness in the entire image. Hence, in the differential image 1143R, only the difference in R component at the pupil position can be generated. More specifically, on the basis of the differential image 1143R, the coordinate positions of a red eye on the image can be specified by the position (red-eye position) having a value equal to or larger than a predetermined value.

An image 1143 shown in FIG. 14 simply represents the difference between the image 1141 and the image 1142. As is apparent from the image 1143, the difference has or can have a difference for portions except the pupils. More specifically, since the accuracy is too low to specify the eye positions, a false portion may be determined as an eye. To the contrary, in the differential image 1143R for only the R component, parts other than the red eye are removed. Hence, the coordinate positions and eye size can accurately be detected. In addition, the processing speed can be increased because arithmetic processing is executed for not all the R, G, and B components but only the R component.

The images 1141 and 1142 have a time lag (0.2 sec in this embodiment). Hence, camera shake by the photographer or an object shift may be generated in the image data in the pre-image display memory 27 with respect to that in the image display memory 24. Subtraction of the image 1142R from the image 1141R is done after one of them is shifted relative to the other on the basis of the shift amount of the coordinates on the image by the camera shake by the photographer or object shift in the image shift detection processing (step S1610), thereby determining the presence/absence of a red-eye region. In comparing the pixels of the two images, an offset (shift amount) is added to the coordinates of the pixels to be read out from one image instead of shifting the entire image.

The processing in step S1611 has been described above. If NO in step S1611, the processing is ended, and the flow returns to step S124 in FIG. 3A.

If YES in step S1611, the data recorded in the image display memory 24 is written in the pre-image display memory 27 in step S1612. Predetermined image display is done on the basis of the image data stored in the pre-image display memory 27 in step S1613.

Then, the processing advances to step S1614 to start time counting again. The processing waits until the predetermined time (0.2 sec in this embodiment) elapses in step S1615. If YES in step S1615, an image is received again and written in the image display memory 24 in step S1616. In step S1617, the shift amount of the currently sensed image (the image stored in the image display memory 24) with respect to the image stored in the pre-image display memory 27 is detected, as in step S1610.

When shift amount detection is executed, the processing advances to step S1618 to determine the position and size of the red eye on the image stored in the image display memory 24 and determine whether the size is less than the first threshold value. If NO in step S1618, the above processing is repeated until it is determined in step S1621 that the image is received a predetermined number of times.

If YES in step S1618, it is determined in step S1619 whether the size of the red-eye region is less than the second threshold value (second threshold value<first threshold value). If NO in step S1619, the flow advances to step S1620 to determine whether the shutter switch SW2 is ON. If NO in step S1620, the flow advances to step S1621. If YES in step S1620, the flow advances to step S1623 to put a higher priority on photography/recording by the user.

In step S1623, a mark (FIG. 9) representing that red-eye correction is to be executed is displayed. If NO in step S1618, and the flow advances to step S1623, the mark is displayed in red. If NO in step S1619, and the flow advances to step S1623, the mark is displayed in yellow.

In any case, the processing advances to step S1624 to set the correction flag to ON to execute red-eye correction processing.

When YES in step S1619, it is determined that red-eye correction processing is unnecessary (the correction flag is kept off). In step S1622, the mark shown in FIG. 9 is displayed in green.

In the above description, red-eye detection is done on the basis of the difference in R component between the image data stored in the image display memory 24 and that stored in the pre-image display memory 27. The determination processing in steps S1618 and S1619 is the same as in steps S1516 and S1517 in FIG. 11B of the first embodiment.

The main part of the second embodiment has been described above. The second embodiment is the same as the first embodiment except the above-described point. More specifically, in the second embodiment, the position of a red eye can be determined also in consideration of the influence of camera shake and the like, as compared to the above-described first embodiment. Hence, accurate red-eye detection and accurate red-eye correction without any sense of incompatibility can be executed.

Third Embodiment

The third embodiment will be described next. The apparatus arrangement according to the third embodiment is the same as that shown in FIG. 13. As a characteristic feature, the light emission mode in red-eye relaxation processing includes a red-eye relaxation effect priority mode (the same processing as in the first and second embodiments and will be referred to as red-eye relaxation mode 1 hereinafter) as the first mode and red-eye relaxation speed priority mode (a mode which simplifies red-eye relaxation processing and puts priority on the instruction from the shutter switch SW2 and will be referred to as red-eye relaxation mode 2 hereinafter) as the second mode. One of the two modes is selected by operating a switch provided on an operation unit 70.

<Operation Processing Flow>

Figure 15A:
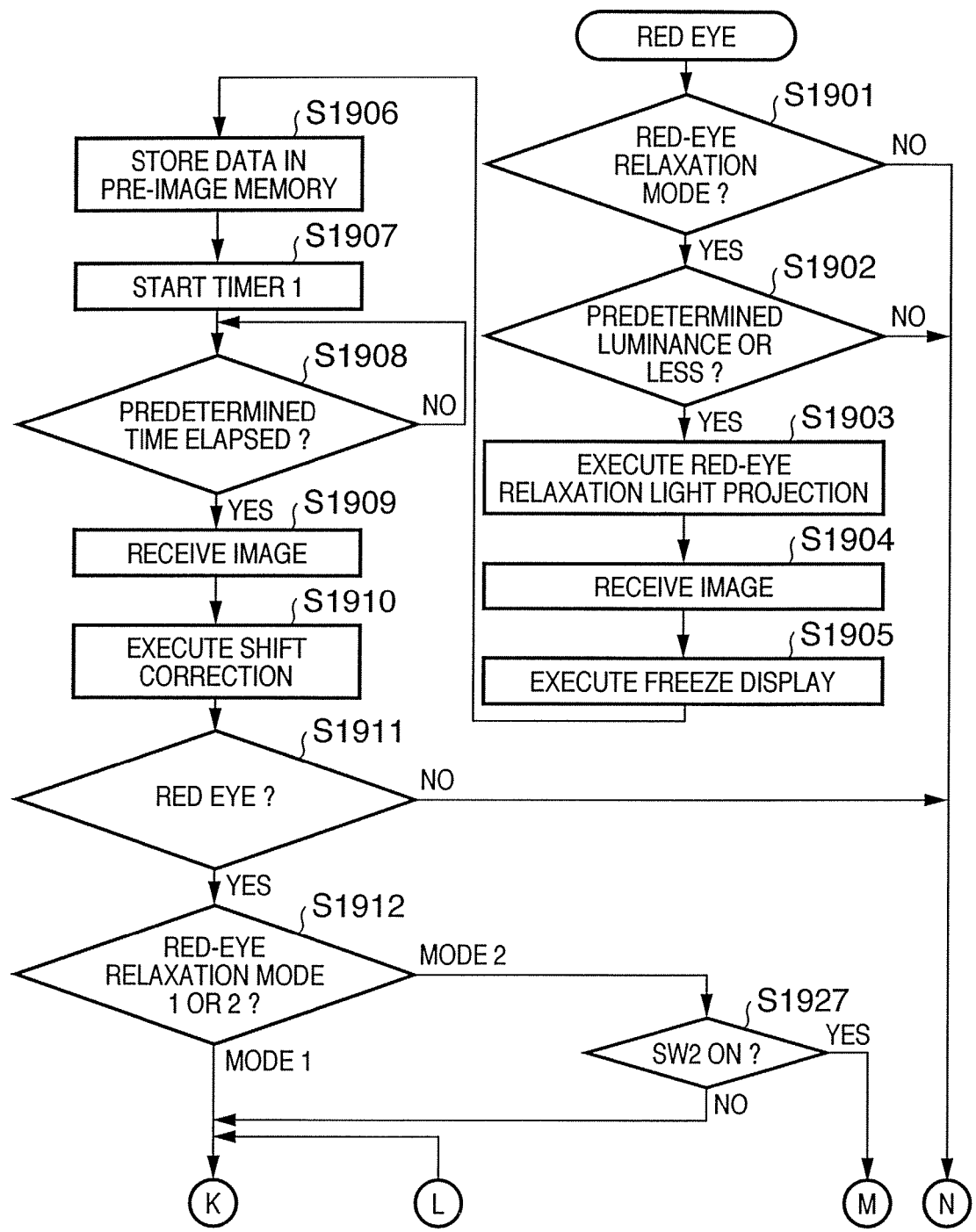
FIGS. 15A and 15B are flowcharts of a red-eye processing routine according to the third embodiment.
Figure 15B:
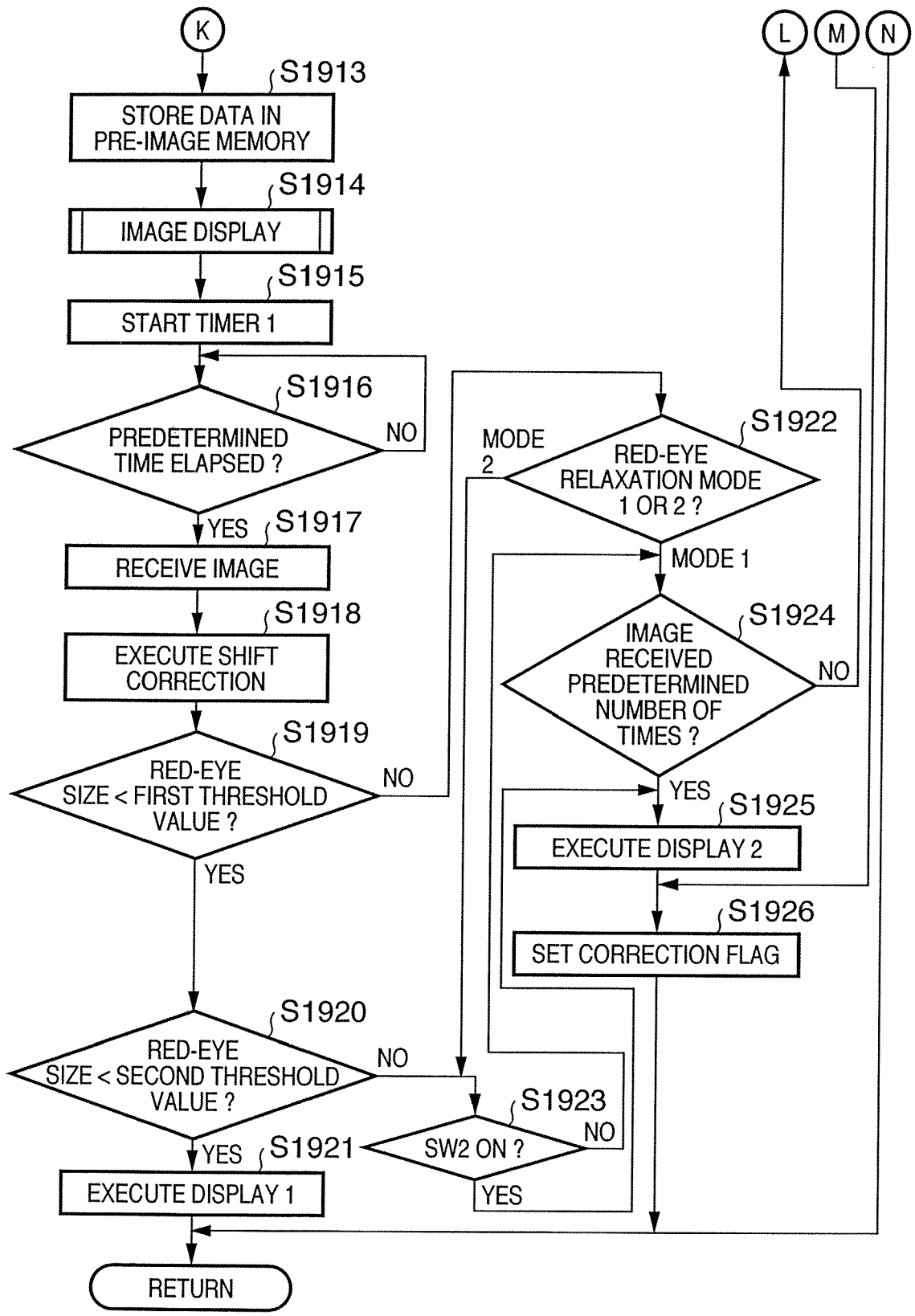

Red-eye processing (step S123 in FIG. 3A) according to the third embodiment will be described with reference to the flowcharts shown in FIGS. 15A and 15B.

A system control circuit 50 checks whether the electronic flash set state by an electronic flash mode SW 65 is the red-eye relaxation mode (step S1901). If NO in step S1901, the red-eye processing is ended, and the flow returns to step S124 in FIG. 3A. If YES in step S1901, it is determined on the basis of the photometry result in step S122 in FIG. 3A whether the luminance is equal to or lower than a predetermined luminance that requires red-eye relaxation (step S1902). If NO in step S1902, it is determined that red-eye processing is unnecessary, and the flow returns to step S124 in FIG. 3A.

If YES in step S1902, the flow advances to step S1903 to drive a light projecting device 49 to start projecting light from a red-eye light projector 304 (FIG. 7A). Processing executed while light projection is being executed will be described below.

In step S1904, sensed digital image data is written in an image display memory 24 through an image sensing element 14, image processing circuit 20, and memory control circuit 22. A frozen image is displayed (step S1905). The data recorded in the image display memory 24 is transferred to a pre-image display memory 27 (step S1906). After that, to decide the next image sensing timing, time counting is started (step S1907). In step S1908, the processing waits until a predetermined time (0.2 sec in this embodiment) elapses. If YES in step S1908, an image is received again and written in the image display memory 24 (step S1909). On the basis of the image data in the image display memory 24 and that in the pre-image display memory 27, an image shift detection unit 29 detects a coordinate shift of the image data in the image display memory 24 with respect to the image data (image data predetermined time before) in the pre-image display memory 27, which is caused by camera shake and object movement (step S1910). The image shift detection unit 29 obtains the moving amount and direction of a moving body in each image by using a motion vector method represented by a known matching method or density gradient method, and a detailed description thereof will be omitted.

The flow advances to step S1911 to match the coordinates of the pixels of the image data in the image display memory 24 and that in the pre-image display memory 27 on the basis of the shift amount between the image data in the image display memory 24 and the image data in the pre-image display memory 27. The two images are compared to determine the presence/absence of a red eye (the coordinate positions and size information are stored in a memory 30). Determination of the presence/absence of a red eye is the same as in the second embodiment, and a description thereof will be omitted.

If NO in step S1911, the processing is ended, and the flow returns to step S124 in FIG. 3A.

If YES in step S1911, the processing advances to step S1912 to determine which of red-eye relaxation modes 1 and 2 is set. If it is determined that red-eye relaxation mode 2 is set, the flow advances to step S1927 to determine whether the shutter switch SW2 is ON. If YES in step S1927, the flow advances to step S1926 to set the correction flag to ON to unconditionally execute red-eye correction. Then, the processing is ended. If NO in step S1927, the flow advances to step S1913. Even if it is determined in step S1912 that red-eye relaxation mode 1 is set, the flow advances to step S1913.

That is, when red-eye relaxation mode 2 is set, processing for determining whether the shutter switch SW2 is ON is executed appropriately. When an image sensing/recording instruction is input by the user, the red-eye processing is immediately ended. In other words, when the shutter switch SW2 is OFF, the same operation is executed in modes 1 and 2.

In step S1913, the data recorded in the image display memory 24 is written in the pre-image display memory 27. In step S1914, display is performed on the basis of the image data stored in the pre-image display memory 27.

In step S1915, time counting is started again. In step S1916, the processing waits until a predetermined time (0.2 sec in this embodiment) elapses. If YES in step S1916, an image is received again and written in the image display memory 24 in step S1917. In step S1918, the image shift of the currently sensed image (the image stored in the image display memory 24) with respect to the image stored in the pre-image display memory 27 is detected, as in step S1910.

When shift amount detection is executed, the processing advances to step S1919 to determine the position and size of the red eye on the image stored in the image display memory 24 by comparing them with the image data in the pre-image display memory 27 and determine whether the size is less than the first threshold value. If NO in step S1919, it is determined in step S1922 which of red-eye relaxation modes 1 and 2 is set. If it is determined that red-eye relaxation mode 1 is set, the flow advances to step S1924. The above processing is repeated until it is determined that the image is received a predetermined number of times (2 sec has elapsed).

If YES in step S1919, it is determined in step S1920 whether the size of the red-eye is less than the second threshold value (second threshold value<first threshold value). If NO in step S1920, or if it is determined in step S1922 that red-eye relaxation mode 2 is set, the processing advances to step S1923 to determine whether the shutter switch SW2 is ON. If NO in step S1923, the flow advances to step S1924. If YES in step S1923, the flow advances to step S1925 to put a higher priority on photography/recording by the user.

In step S1925, a mark (FIG. 9) representing that red-eye correction is to be executed is displayed. If NO in step S1919, and the flow advances to step S1925, the mark is displayed in red. If NO in step S1920, and the flow advances to step S1925, the mark is displayed in yellow.

In any case, the processing advances to step S1926 to set the correction flag to ON to execute red-eye correction processing.

When YES in step S1921, it is determined that red-eye correction processing is unnecessary (the correction flag is kept off). In step S1921, the mark shown in FIG. 9 is displayed in green.

In the above description, red-eye detection is done on the basis of the difference in R component between the image data stored in the image display memory 24 and that stored in the pre-image display memory 27. The determination processing in steps S1919 and S1920 is the same as in steps S1516 and S1517 in FIG. 11B of the first embodiment.

The main part of the third embodiment has been described above. According to the third embodiment, the following effect can be obtained in addition to the functions and effects of the second embodiment.

Even when the sizes of the red-eye region is equal to or more than the first threshold value, and time of 2 sec has not elapsed yet, image sensing/recording with priority on the image sensing/recording instruction from the user is permitted. When this mode is selected, the user hardly misses the shutter chance.

Fourth Embodiment

The fourth embodiment will be described. The apparatus arrangement according to the fourth embodiment is the same as that shown in FIG. 13, and a description thereof will be omitted.

In the first to third embodiments, red-eye relaxation light projection is executed before flash photography. In the fourth embodiment, after flash photography, processing waits until a predetermined time elapses, and flash photography is executed again. The position of a red eye is detected from the comparison result between the two images.

<Operation Processing Flow>

Figure 16:
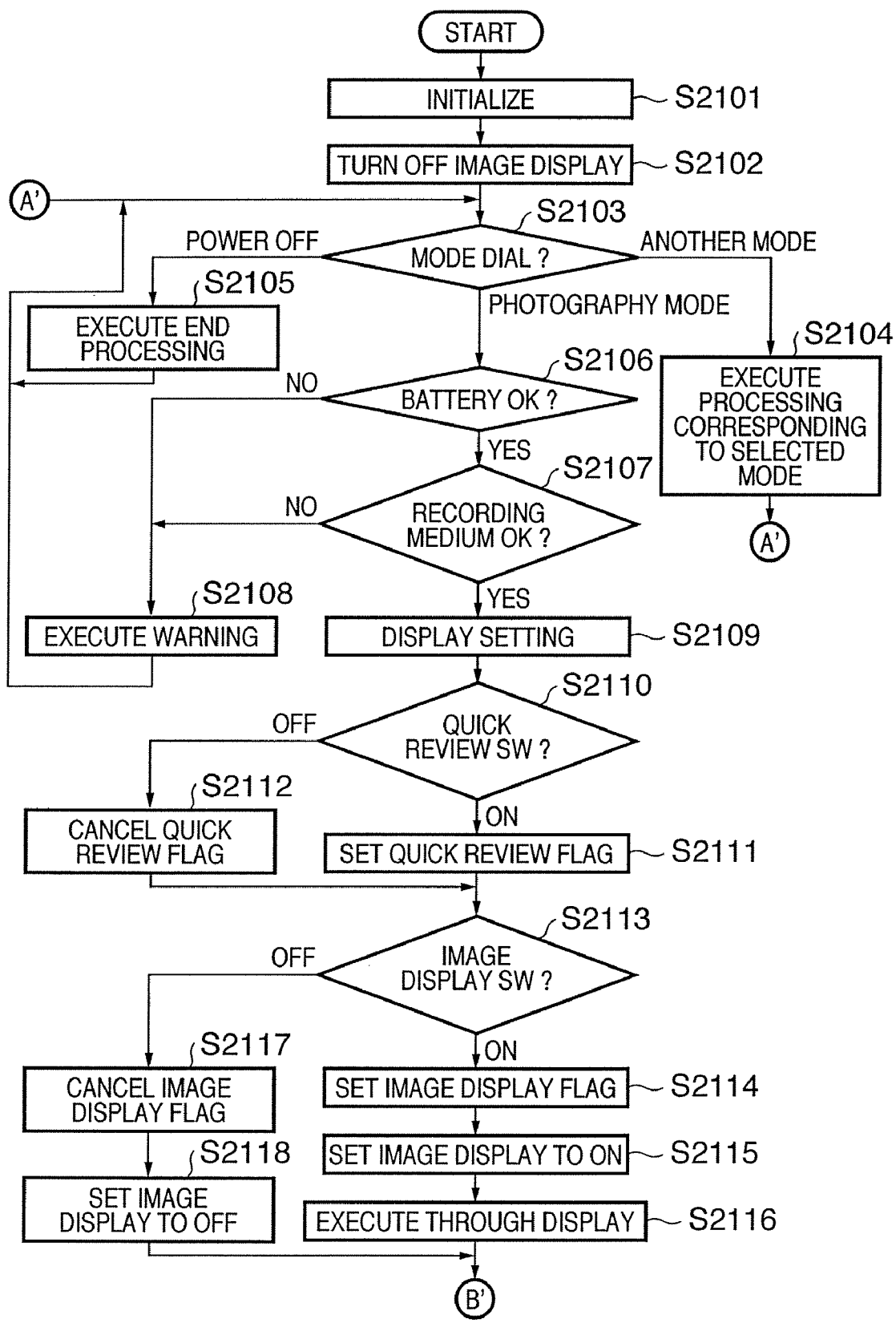
FIG. 16 is a flowchart of a main routine according to the fourth embodiment.
Figure 17A:
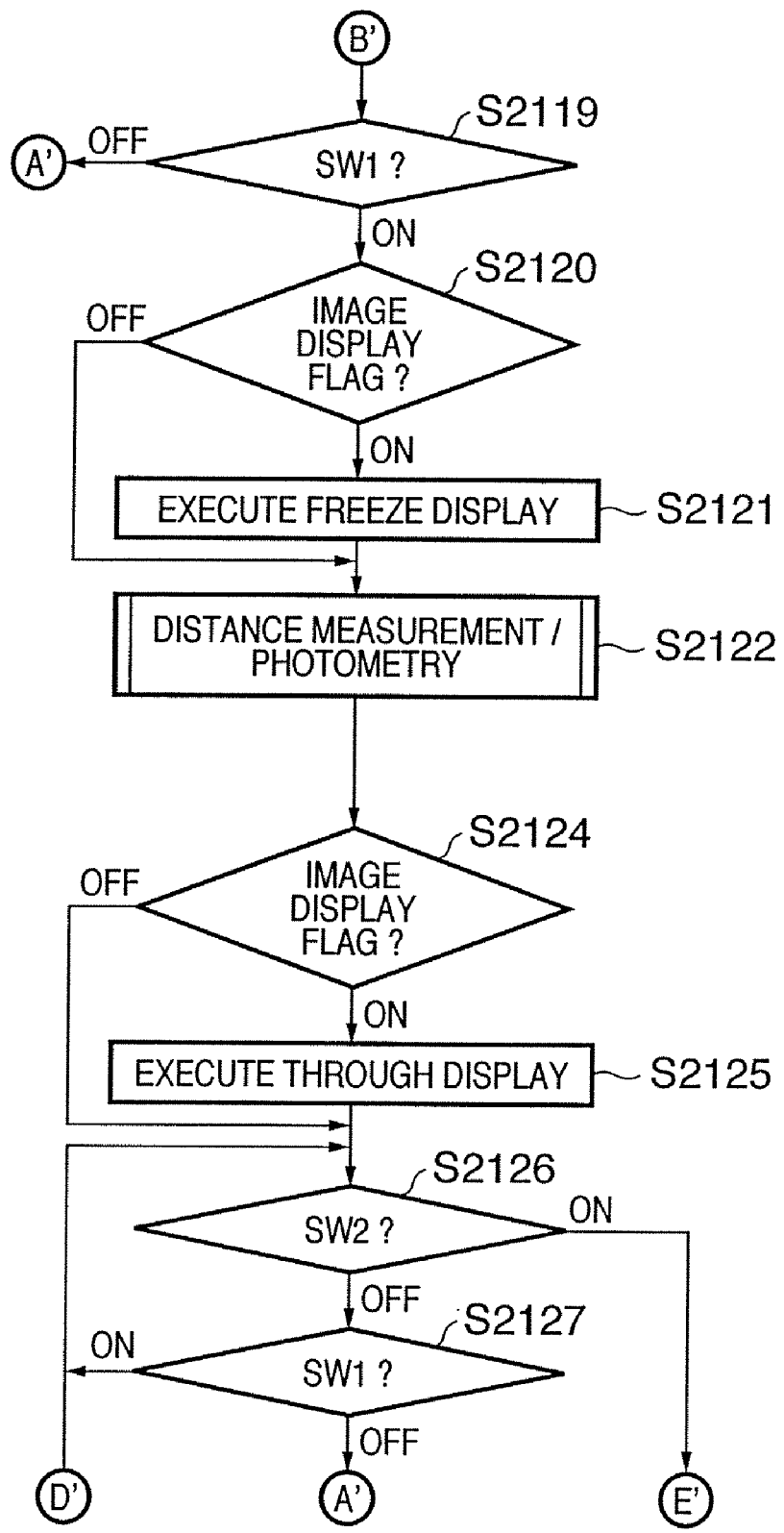
FIGS. 17A and 17B are flowcharts of a main routine according to the fourth embodiment.
Figure 17B:
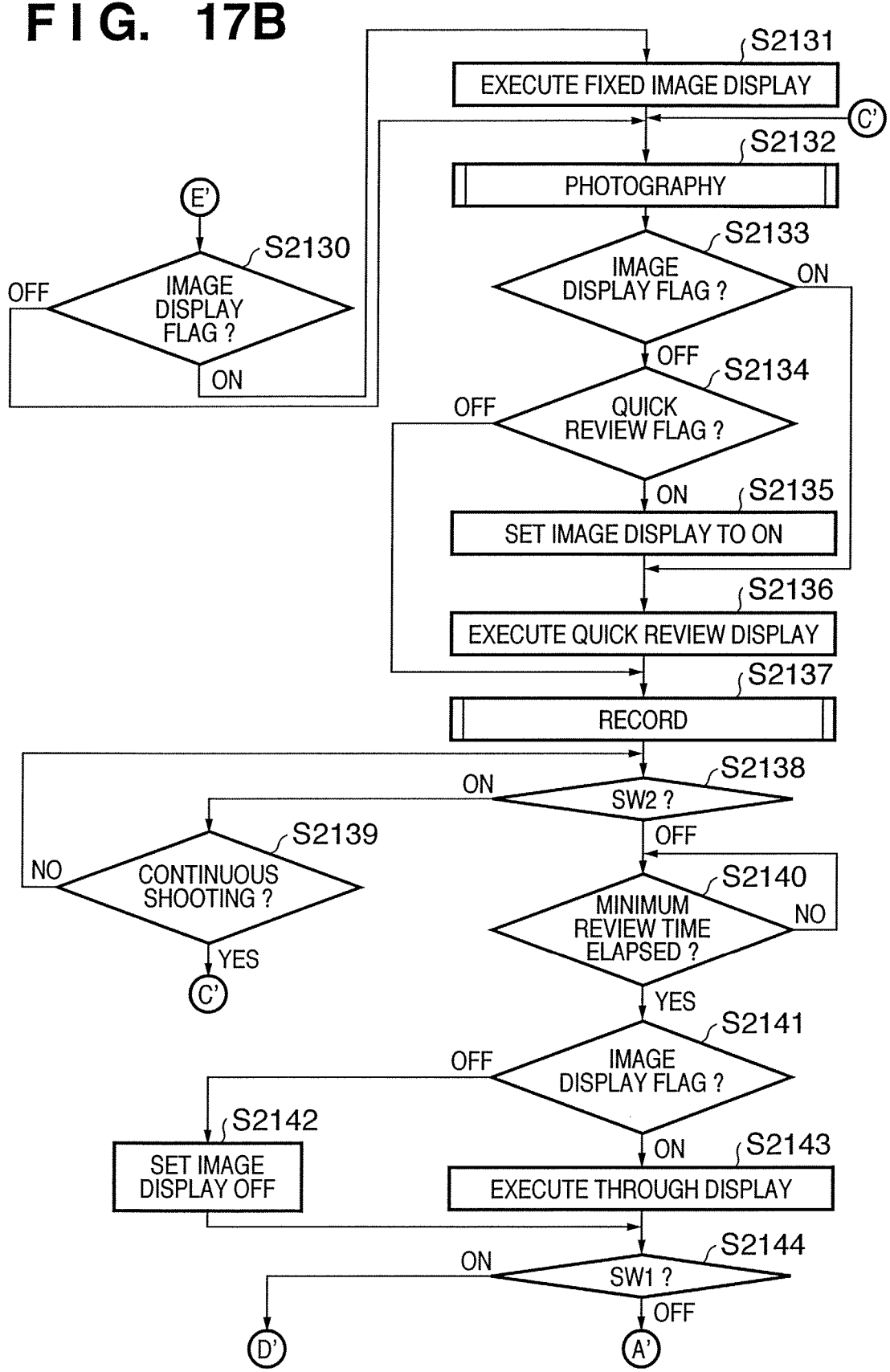
Figure 18A:
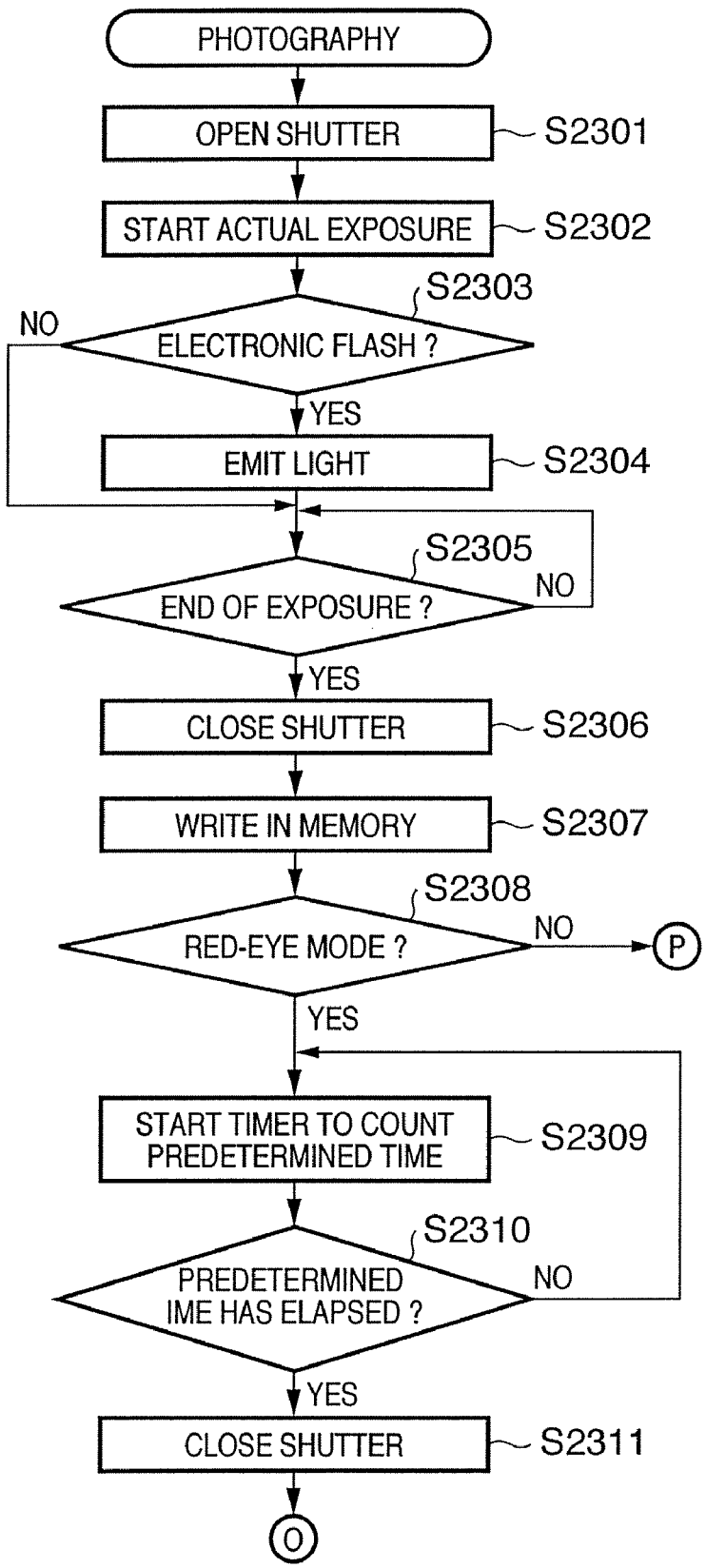
FIGS. 18A and 18B are flowcharts of a photography routine according to the fourth embodiment.
Figure 18B:
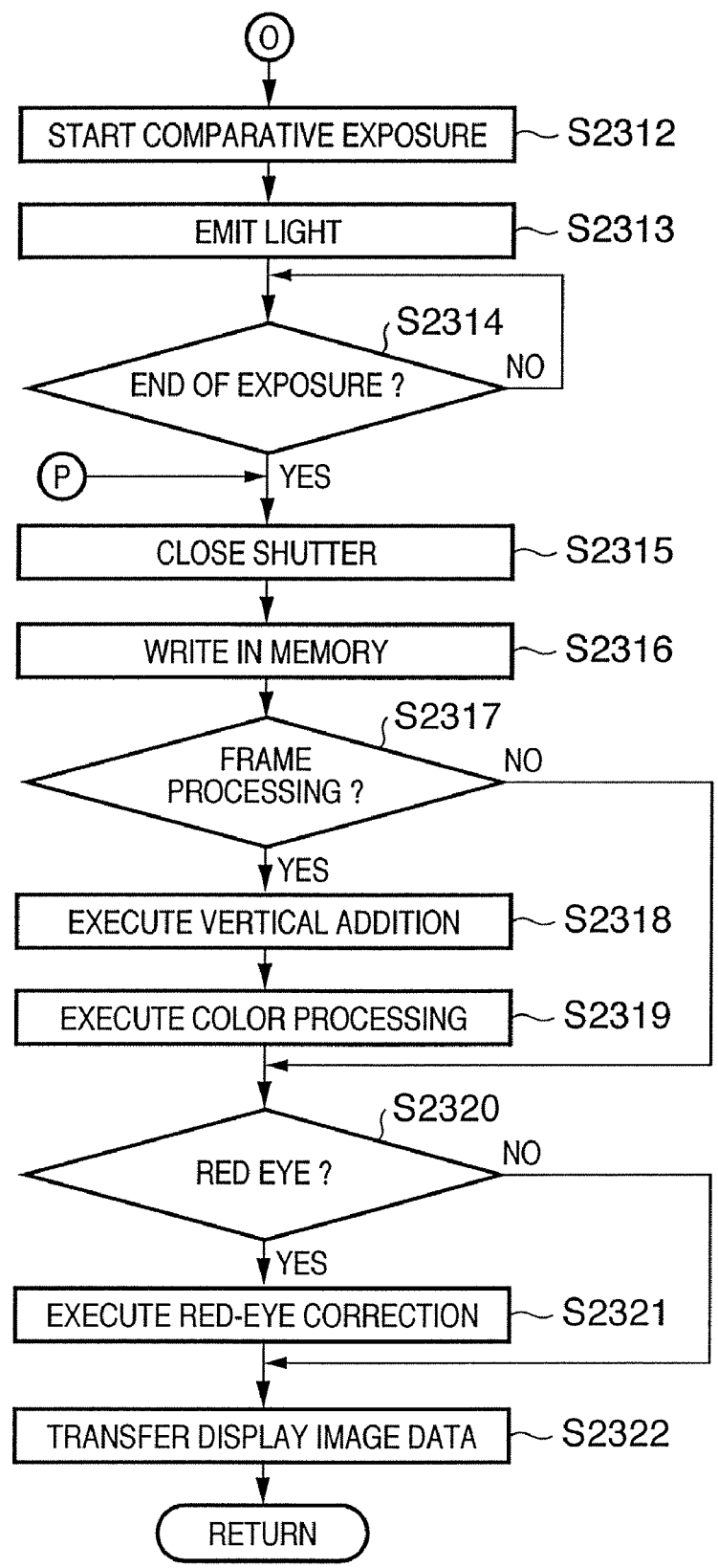

The processing procedures of the fourth embodiment will be described with reference to FIGS. 16 to 18A and 18B. FIGS. 16, 17A, and 17B show the main processing in the fourth embodiment. FIGS. 18A and 18B show details of photography processing in step S2132 in FIG. 16.

Referring to FIG. 16, when the apparatus is powered on by, e.g., loading a new battery, a system control circuit 50 initializes flags and control variables (step S2101) and initializes image display of an image display unit 28 to the OFF state (step S2102).

The system control circuit 50 determines the set position of a mode dial 60. When the mode dial 60 is set to power OFF (step S2103), the display states of display units are changed to the end state. The barrier of a protection unit 102 is closed to protect the image sensing unit. Necessary parameters, set values, and set modes, including flags and control variables, are recorded in a nonvolatile memory 56. A power supply control unit 80 cuts off unnecessary power of the units of an apparatus 100, including the image display unit 28. After the predetermined end processing is executed (step S2105), the flow returns to step S2103.

If it is determined in step S2103 that the mode dial 60 is set to power ON, and the photography mode is set, the flow advances to step S2106. If it is determined that the mode dial 60 is set to any other mode (e.g., browsing of sensed and stored images or selection and erase of images), the system control circuit 50 executes processing corresponding to the selected mode (step S2104). After the end of the processing, the flow returns to step S2103.

In step S2106, the system control circuit 50 causes the power supply control unit 80 to determine whether the level or operation situation of a power supply 86 including a battery or the like has a problem. If NO in step S2106, an indicator unit 54 executes predetermined warning indication by an image or sound (step S2108), and the flow returns to step S2103.

If YES in step S2106, the system control circuit 50 determines whether the operation state of a recording medium 200 or 210 has a problem for the operation of the apparatus 100 and, more particularly, the image data recording/playback operation for the recording medium (step S2107). If NO in step S2107, the indicator unit 54 executes predetermined warning indication by an image or sound (step S2108), and the flow returns to step S2103.

If YES in step S2107, the flow advances to step S2109 to cause the indicator unit 54 to indicate various set states of the apparatus 100 by an image or sound. If image display of the image display unit 28 is ON, various set states of the apparatus 100 are indicated by an image or sound by using even the image display unit 28.

In step S2110, the system control circuit 50 checks the set state of a quick review ON/OFF switch 68. If quick review ON is set, a quick review flag is set (step S2111). If quick review OFF is set, the quick review flag is canceled (step S2112). The state of the quick review flag is stored in the internal memory of the system control circuit 50 or a memory 52.

The system control circuit 50 determines the set state of an image display ON/OFF switch 66 (step S2113). If image display ON is set, an image display flag is set (step S2114). In addition, image display of the image display unit 28 is set to the ON state (step S2115). Furthermore, a through display state that sequentially displays sensed image data is set (step S2116). Then, the flow advances to step S2119.

In the through display state, data which are sequentially written in an image display memory 24 through an image sensing element 14, A/D converter 16, image processing circuit 20, and memory control circuit 22 are sequentially displayed on the image display unit 28 through the memory control circuit 22 and D/A converter 26, thereby implementing the electronic finder function.

If it is determined in step S2113 that the image display ON/OFF switch 66 is set to image display OFF, the processing advances to step S2117 to cancel the image display flag. In addition, in step S2118, image display of the image display unit 28 is set to the OFF state. Then, the flow advances to step S2119.

When image display is OFF, photography is performed by using an optical finder 104 without using the electronic finder function by the image display unit 28. In this case, the power consumed by the image display unit 28 and D/A converter 26, which consume large power, can be reduced. The state of the image display flag is stored in the internal memory of the system control circuit 50 or the memory 52.

In step S2119 (FIG. 17A), it is determined whether a shutter switch SW1 is ON. More specifically, it is determined whether the shutter switch is pressed halfway. If it is determined that the shutter switch is OFF, the flow returns to step S2103 to repeat the above-described processing.

If it is determined that the shutter switch SW1 is ON, the flow advances from step S2119 to step S2120. The system control circuit 50 determines the image display flag state stored in its internal memory or the memory 52 (step S2120). If the image display flag is set, the display state of the image display unit 28 is set to a freeze display state (step S2121). The flow advances to step S2122.

In the freeze display state, image data rewrite that is executed for the image display memory 24 through the image sensing element 14, A/D converter 16, image processing circuit 20, and memory control circuit 22 is inhibited. The finally written image data is displayed on the image display unit 28 through the memory control circuit 22 and D/A converter 26, thereby displaying a frozen image on the electronic finder. If the image display flag is canceled, the processing in step S2121 is skipped, and the flow advances to step S2122.

In step S2122, the system control circuit 50 sets the focal length of a photographic lens 10 on the object by executing distance measurement and also decides the F-number and shutter open time (shutter speed) by executing photometry. When the electronic flash is set to the auto mode, whether electronic flash is to be used is also set in the photometry. The distance measurement/photometry processing in step S2122 has already been described in detail in the first embodiment, and a description thereof will be omitted.

When the distance measurement/photometry is ended, the processing advances to step S2124. The system control circuit 50 determines the image display flag state stored in its internal memory or the memory 52. If the image display flag is set, the display state of the image display unit 28 is set to the through display state (step S2125), and the flow advances to step S2126. The through display state in step S2125 is the same as the through state in step S2116 described above.

In step S2126, it is determined whether a shutter switch SW2 is ON, i.e., whether the shutter button is fully pressed. If the shutter switch SW2 is OFF, it is determined in step S2127 whether the shutter switch SW1 is also released. If the shutter SW1 is also released (OFF), the flow returns to step S2103.

If it is determined that the shutter switch SW2 is ON, the processing advances to step S2130. In step S2130, the system control circuit 50 determines the image display flag state stored in its internal memory or the memory 52. If the image display flag is set, fixed image display is displayed on the image display unit 28 in step S2131. The flow advances to step S2132.

In this fixed image display processing, while encoding and recording processing are being executed after image sensing, a predetermined mark (symbol) representing that the progress of the processing is displayed for the user. When this mark is displayed on the image display unit 28 through the memory control circuit 22 and D/A converter 26, an image with a fixed color is displayed on the electronic finder.

If it is determined in step S2130 that the image display flag is canceled, the processing in step S2131 is skipped, and photography processing in step S2132 is executed. This will be described later.

When the processing in step S2132 is ended, the flow advances to step S2133 to cause the system control circuit 50 to determine the image display flag state stored in its internal memory or the memory 52. If it is determined that the image display flag is set, quick review display is executed (step S2136). In this case, the image display unit 28 is always displayed as the electronic finder even during photography. Quick review display even immediately after photography is also executed.

If it is determined in step S2133 that the image display flag is canceled, the quick review flag state stored in the internal memory of the system control circuit 50 or the memory 52 is determined (step S2134). If the quick review flag is set, image display of the image display unit 28 is set to the ON state (step S2135), and quick review display is executed (step S2136).

As described above, the electronic finder function is unnecessary because photography is executed by using the optical finder 104 to save the power. For this reason, even when image display of the image display unit 28 is OFF, a photographed image can automatically be displayed on the image display unit 28 immediately after photography when the quick review function is set by the quick review switch. Accordingly, a convenient function for power saving and photographed image confirmation can be provided.

If it is determined in step S2133 that the image display flag is canceled, and it is determined in step S2134 that the quick review flag is also canceled, the image display unit 28 is kept in the OFF state, and the flow advances to step S2137. In this case, even after photography, the image display unit 28 is kept off, and quick review display is not executed. This use method places importance on power saving by omitting use of the electronic finder function of the image display unit 28 and can be used when confirmation of a photographed image immediately after photography is unnecessary, like when photography is to be continued by using the optical finder 104.

In step S2137, the system control circuit 50 reads out the photographed image data written in a memory 30. The system control circuit 50 executes various kinds of image processing by using the memory control circuit 22 and even the image processing circuit 20, as needed. In addition, the system control circuit 50 executes image compression corresponding to the set mode by using a compression/expansion circuit 32. After that, recording processing for writing the image data in the recording medium 200 or 210 is executed. The recording processing is the same as that described in the first embodiment, and a description thereof will be omitted.

When the recording processing is ended, the processing advances to step S2138 to determine whether the shutter switch SW2 is in the pressed state. If it is determined that the shutter switch SW2 is kept in the ON state, the flow advances to step S2139 to cause the system control circuit 50 to determine the continuous shooting flag state stored in its internal memory or the memory 52 (step S2139). If it is determined that the continuous shooting flag is set (ON), photography is to be continuously executed. The flow returns to step S2129 to execute the next photography.

If it is determined in step S2139 that the continuous shooting flag is not set, the processing waits until it is determined in step S2138 that the shutter switch SW2 is released.

When the recording processing is ended, the shutter switch SW2 is set in the released state. Alternatively, when photographed images are confirmed by continuously executing quick review display by keeping the shutter switch SW2 pressed, and the shutter switch SW2 is released, the processing advances to step S2140.

In step S2140, the processing waits until a predetermined time elapses. In step S2141, the system control circuit 50 determines whether the image display flag is set. If it is determined that the image display flag is set, the display state of the image display unit 28 is set to the through display state in step S2143, and the flow advances to step S2144. In this case, the through display state can be set in which after a photographed image is confirmed by quick review display on the image display unit 28, sensed image data are sequentially displayed for the next photography.

If it is determined in step S2141 that the image display flag is canceled, image display of the image display unit 28 is set to the OFF state in step S2142, and the flow advances to step S2144. In this case, the photographed image is confirmed by quick review display of the image display unit 28. After that, the function of the image display unit 28 is stopped to save the power. Accordingly, the power consumed by the image display unit 28 and D/A converter 26, which consume large power, can be reduced.

In step S2144, it is determined whether the shutter switch SW1 is in the ON state. If it is determined that the shutter switch SW1 is ON, the flow returns to step S2126 to prepare for next photography. If it is determined that the shutter switch SW1 is released once, the system control circuit 50 returns from step S2144 to step S2103 to end the series of photographic operations.

The main processing in the embodiment has been described above. The processing operations in step S2132 will be described next in accordance with the flowcharts in FIGS. 18A and 18B.

First, in accordance with the photometry data stored in the internal memory of the system control circuit 50 or the memory 52, the system control circuit 50 causes an exposure control unit 40 to start actual exposure of the image sensing element 14 by opening a shutter 12 having a stop function in accordance with the F-number (steps S2301 and S2302).

In step S2303, it is determined on the basis of the electronic flash flag whether an electronic flash 48 is necessary. If YES in step S2303, the electronic flash is caused to emit light (step S2304). The electronic flash emits light under two conditions: electronic flash light emission is explicitly instructed by the user, or it is determined by photometry processing that the electronic flash is necessary. The processing in step S2304 is executed when one of the conditions is satisfied.

In step S2305, the system control circuit 50 waits for the end of exposure of the image sensing element 14 (the end of charge accumulation in the image sensing element 14) in accordance with the photometry data. If it is determined that exposure is ended, the shutter 12 is closed (step S2306). A charge signal is read from the image sensing element 14. The data of the photographed image is written in the memory 30 through the A/D converter 16, image processing circuit 20, and memory control circuit 22 or directly from the A/D converter 16 through the memory control circuit 22 (step S2307).

The flow advances to step S2308. The system control circuit 50 checks whether the electronic flash set state by the electronic flash mode SW 65 is the red-eye relaxation mode. If NO in step S2308, or no electronic flash light emission is executed in step S2304, the processing in steps S2309 to S2316 is skipped, and the flow advances to step S2317.

If YES in step S2308, and it is determined in step S2304 that electronic flash light emission is performed, the flow advances to step S2309.

In step S2309, time counting starts. In step S2310, the processing waits until a predetermined time elapses. If YES in step S2310, the flow advances to step S2311 to causes the exposure control unit 40 to expose the image sensing element 14 by opening the shutter 12 having a stop function in accordance with the F-number by using the photometry data again (steps S2311 and S2312). In addition, the electronic flash is also caused to emit light (step S2313). The system control circuit 50 waits for the end of exposure of the image sensing element 14 in accordance with the photometry data (step S2314). The shutter 12 is closed (step S2315). A charge signal is read out from the image sensing element 14. The data of the photographed image is written in the memory 30 through the A/D converter 16, image processing circuit 20, and memory control circuit 22 or directly from the A/D converter 16 through the memory control circuit 22 (step S2316). Hence, the memory 30 stores the two sensed image data.

The flow advances to step S2317 to determine on the basis of the set photography mode whether frame processing needs to be executed. If YES in step S2317, the system control circuit 50 reads out the image data written in the memory 30 by using the memory control circuit 22 and the image processing circuit 20 as needed in step S2318 and sequentially executes vertical addition processing (step S2318) and color processing (step S2319).

In step S2320, the image data of actual exposure and that of comparative exposure, which are written in the memory 30, are compared to determine the presence/absence of a red eye (step S2317). In this image data comparison, the image data (corresponding to an image 1141 in FIG. 14 when the pupil diameter is maximum) obtained by actual exposure (steps S2302 to S2305) and the image data (corresponding to an image 1142 in FIG. 14) obtained by comparative exposure after the elapse of a predetermined time from the actual exposure are loaded by the memory control circuit 22 to the system control circuit 50 and compared. The pupil diameter in comparative exposure after the elapse of a predetermined time from the actual exposure is contracted and has a change in color as compared to the pupil diameter in the actual exposure. More specifically, the image data in the actual exposure and that in the comparative exposure have a difference because the pupil diameter changes. Pixels having this difference can be specified as portions where a red eye is generated. In addition, the brightness of the R component of the RGB data of the pupil portion image changes depending on the degree of the red eye. Hence, when the R component data (images 1141R and 1142R in FIG. 14) in the image data 1141 and 1142 are compared, the red eye can be detected. More specifically, the image 1142R as the R component of the image data 1142 is subtracted from the image 1141R as the R component of the image data 1141. On the basis of a differential image 1143R obtained by subtraction, the position and size of the red eye are determined. If the differential image 1143R has no pixels whose differential value is equal to or more than a predetermined value, or the number of pixels is less than a predetermined value, it is determined that no red eye is detected.

Since only the R components are compared, the detection result can quickly be obtained as compared to comparison/detection targeted to all image components (RGB data). If no red eye is detected on the basis of the detection result by red-eye detection (step S2320), the image obtained by the actual exposure is transferred to the image display memory 24 and displayed (step S2322).

When a red eye is detected, predetermined red-eye correction (step S2321) is executed for the actual exposure image data on the basis of the obtained coordinate positions and size, and the processed image data is written in the memory 30. The flow advances to step S2322 to display the corrected image data.

The comparative image becomes unnecessary at this time and is deleted from the memory 30 or set to be overwritable.

The series of processing operations are thus ended, and the photography processing routine (step S2132) is ended.

As described above, according to the fourth embodiment, when an instruction of image sensing/recording by electronic flash light emission is input, actual exposure by electronic flash light emission at a timing corresponding to the user instruction is executed first. Subsequently, exposure for obtaining a comparative image is executed by using electronic flash light emission again. Accordingly, the photographic conditions of the two sensed images are substantially the same. Hence, a red eye can accurately be detected and corrected. In addition, image sensing and storage can be performed substantially without any time lag between the timing of the user instruction and that of actual photography.

In the above embodiments, a digital still camera has been described as an example. However, the present invention is not limited to the above embodiments and can also be applied to a digital video camera having a still image sensing function or a cellular phone incorporating a camera function.

In the above embodiments, light projection for red-eye detection and red-eye relaxation is done by the light projecting device 49 including an LED or lamp on the assumption of continuous light emission. However, the electronic flash 48 may be used. The electronic flash 48 intermittently emits light. The electronic flash light emission is done in exposure in steps S1504 and S1515 in FIG. 11B.

When the light projecting unit is arranged at a position separated from the optical axis of the photographic lens by a distance equal to or smaller than that between the optical axis and the electronic flash unit, the red-eye generation state can more reliably be generated than that at the time of electronic flash light emission. Hence, the probability of red-eye detection increases.

The light emission for the comparative exposure in step S2313 need not always be executed by the electronic flash. For example, an LED or lamp may be used.

The first predetermined size or second predetermined size, which is used to determine the size of a red eye, has been described to be ½ or ⅓ the iris diameter in the embodiments. However, the criterion need not always be the fixed amount. The condition may be changed in accordance with the focal length or the distance (measured distance) to the object.

The brightness of projected light from the light projecting device may be increased in accordance with the red-eye relaxation state to sufficiently obtain the red-eye relaxation effect. When the brightness of projected light is changed over time in accordance with the red-eye diameter, a large red-eye relaxation effect can be obtained.

The interval of image sensing, i.e., image reception in red-eye relaxation is set to 0.2 sec. However, the predetermined time is not limited to 0.2 sec and can arbitrarily set in accordance with the capability of the camera such as the time in which the red-eye effect is obtained (short time when it is bright, or long time when it is dark), the possible light emission interval of the electronic flash, or the image data processing speed.

The predetermined time is set to 0.2 sec, the predetermined number of times of set to 10 times, and the light projection time is set to about 2 sec. The red-eye relaxation effect changes depending on the intensity of the light source for light projection. Hence, this time (predetermined number of times) is not limited to about 2 sec.

The image comparison unit 29 need not be a unique image comparison unit. Instead, if the system control circuit 50 has a processing capability of image comparison at a sufficiently high speed, and a red eye or shift can be detected without any photography time lag, image comparison is executed by the system control circuit 50.

In the embodiments (particularly, the first embodiment), images to be compared are stored in the pre-image display memory 27 and the image display memory 24 which stores images after thinning processing to display a sensed image. This is preferable to decrease the number of pixels in comparison operation. If the arithmetic speed is sufficient, images without thinning are preferably compared. When thinning is not executed, the coordinates and size of a red eye can more accurately be determined.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus, comprising:
   an image sensing unit;
   a light projection unit;
   an image acquisition unit that acquires sensed image data from the image sensing unit before a recording instruction is input by a user;
   a display unit that displays the sensed image data acquired by the image acquisition unit;
   a detection unit that detects a red-eye region in the sensed image data acquired by the image acquisition unit during light projection by the light projection unit;
   a switching unit that switches to one of displaying, on the display unit, an entire image of the sensed image data and displaying an enlarged image of a partial region within the sensed image data according to the red-eye region detected by the detection unit, wherein the enlarged image to be displayed on the display unit is an image to which a red-eye correction processing for the red-eye region is not applied and the display unit displays only one enlarged image at any given time; and
   a correction unit, wherein, after the recording instruction is input by a user and, in response to which the image acquisition unit acquires a photographed image, the correction unit executes red-eye correction processing on the photographed image in accordance with information from the detected red-eye region.

2. The image sensing apparatus according to claim 1, wherein the display unit displays the enlarged image before the recording instruction is input by a user.

3. The image sensing apparatus according to claim 2, wherein the recording instruction input by a user includes a signal that indicates a shutter button is fully pressed.

4. The image sensing apparatus according to claim 1, wherein the sensed image data acquired by the image acquisition unit includes a first image and a second image acquired after the first image, wherein the entire image and the enlarged image both are based on the second image and the second image is an image to which a red-eye correction processing for the red-eye region is not applied.

5. The image sensing apparatus of claim 1, wherein the light projection unit is a red eye relaxation light projection unit, the image sensing apparatus further comprising:
   an electronic flash unit,
   wherein the correction unit includes a control unit that causes the red eye relaxation light projection unit to execute the red-eye correction processing for the red-eye region as a red eye relaxation operation and, after the red eye relaxation operation, causes the electronic flash unit to project light, the control unit comprising a red eye determination unit which determines a red eye size by executing preliminary image sensing during red eye relaxation light projection by the red eye relaxation light projection unit, and a processing determination unit which determines, on the basis of a determination result by the red eye determination unit, whether processing is to shift to image sensing with light projection by the electronic flash unit and whether red eye relaxation by the red eye relaxation light projection unit is to be continued.

6. A method to control an image sensing apparatus, wherein the image sensing apparatus includes an image sensing unit, a light projection unit, an image acquisition unit, a display unit, a detection unit, a switching unit, and a correction unit, the method comprising:
   acquiring, using the image acquisition unit, sensed image data from the image sensing unit before a recording instruction is input by a user;
   displaying, on the display unit, the sensed image data acquired by the image acquisition unit;
   detecting, using the detection unit, a red-eye region in the sensed image data acquired by the image acquisition unit during light projection by the light projection unit;
   switching, using the switching unit, to one of displaying, on the display unit, an entire image of the sensed image data and displaying an enlarged image of a partial region within the sensed image data according to the red-eye region detected by the detection unit, wherein the enlarged image to be displayed on the display unit is an image to which a red-eye correction processing for the red-eye region is not applied and the display unit displays only one enlarged image at any given time; and
   after the recording instruction is input by a user and, in response to which the image acquisition unit acquires a photographed image, using the correction unit to execute red-eye correction processing on the photographed image in accordance with information from the detected red-eye region.

7. The method according to claim 6,
wherein, in the display step, the enlarged image is displayed before the recording instruction is input by a user.

8. The method according to claim 7, wherein the recording instruction input by a user includes a signal that indicates a shutter button is fully pressed.

9. The method according to claim 6, wherein the sensed image data acquired by the image acquisition unit includes a first image and a second image acquired after the first image, wherein the entire image and the enlarged image both are based on the second image and the second image is an image to which a red-eye correction processing for the red-eye region is not applied.

10. The method of claim 6, wherein the light projection unit is a red eye relaxation light projection unit and the image sensing apparatus further includes an electronic flash unit, the method further comprising:

using a control unit of the correction unit to execute the red-eye correction processing for the red-eye region as a red eye relaxation operation and, after the red eye relaxation operation, using the control unit to cause the electronic flash unit to project light, the control unit comprising a red eye determination unit which determines a red eye size by executing preliminary image sensing during red eye relaxation light projection by the red eye relaxation light projection unit, and a processing determination unit which determines, on the basis of a determination result by the red eye determination unit, whether processing is to shift to image sensing with light projection by the electronic flash unit and whether red eye relaxation by the red eye relaxation light projection unit is to be continued.

* * * * *